US011010956B2

(12) United States Patent
Blackmon et al.

(10) Patent No.: US 11,010,956 B2
(45) Date of Patent: May 18, 2021

(54) FOVEATED RENDERING

(71) Applicant: Imagination Technologies Limited, Kings Langley (GB)

(72) Inventors: Steven Blackmon, San Rafael, CA (US); Luke T. Peterson, San Francisco, CA (US); Cuneyt Ozdas, San Mateo, CA (US); Steven J. Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 569 days.

(21) Appl. No.: 15/372,589

(22) Filed: Dec. 8, 2016

(65) Prior Publication Data

US 2017/0169602 A1   Jun. 15, 2017

Related U.S. Application Data

(60) Provisional application No. 62/264,992, filed on Dec. 9, 2015, provisional application No. 62/291,197, filed on Feb. 4, 2016.

(51) Int. Cl.
*G06T 15/06* (2011.01)
*G06T 15/00* (2011.01)
(Continued)

(52) U.S. Cl.
CPC ............ *G06T 15/06* (2013.01); *G06F 3/013* (2013.01); *G06T 3/0018* (2013.01);
(Continued)

(58) Field of Classification Search
None
See application file for complete search history.

(56) References Cited

U.S. PATENT DOCUMENTS 9,240,069 B1 *   1/2016   Li ........................... G06T 15/00
9,261,959 B1 *   2/2016   D'Amico ................ G06F 3/013
(Continued)

OTHER PUBLICATIONS

Mehta et al; Filtering Environment Illumination for Interactive Physically-Based Rendering in Mixed Reality; Eurographics Symposium on Rendering—Experimental Ideas & Implementations (2015); The Eurographics Association 2015.
(Continued)

*Primary Examiner* — Tize Ma
(74) *Attorney, Agent, or Firm* — Potomac Law Group, PLLC; Vincent M DeLuca

(57) ABSTRACT

Foveated rendering for rendering an image uses a ray tracing technique to process graphics data for a region of interest of the image, and a rasterisation technique is used to process graphics data for other regions of the image. A rendered image can be formed using the processed graphics data for the region of interest of the image and the processed graphics data for the other regions of the image. The region of interest may correspond to a foveal region of the image. Ray tracing naturally provides high detail and photo-realistic rendering, which human vision is particularly sensitive to in the foveal region; whereas rasterisation techniques are suited for providing temporal smoothing and anti-aliasing in a simple manner, and is therefore suited for use in the regions of the image that a user will see in the periphery of their vision.

18 Claims, 8 Drawing Sheets

(51) Int. Cl.
*G06T 7/00* (2017.01)
*G06T 3/00* (2006.01)
*G06F 3/01* (2006.01)

(52) U.S. Cl.
CPC .......... *G06T 3/0093* (2013.01); *G06T 15/005* (2013.01); *G06T 2210/36* (2013.01)

(56) References Cited

U.S. PATENT DOCUMENTS

| | | |
|---|---|---|
| 9,727,991 B2 | 8/2017 | Guenter et al. |
| 2008/0211804 A1 | 9/2008 | Hempel et al. |
| 2010/0079457 A1 | 4/2010 | Tavenrath |
| 2010/0188396 A1* | 7/2010 | Mejdrich ............... G06T 15/06 345/419 |
| 2012/0194644 A1* | 8/2012 | Newcombe ............ G06T 7/20 348/46 |
| 2014/0063016 A1 | 3/2014 | Howson et al. |
| 2014/0247277 A1* | 9/2014 | Guenter ................ G06T 11/00 345/611 |
| 2015/0287240 A1 | 10/2015 | Janczak et al. |
| 2016/0027203 A1 | 1/2016 | Lee et al. |
| 2016/0071311 A1* | 3/2016 | Kim ...................... G06T 15/005 345/426 |
| 2016/0259977 A1 | 9/2016 | Asbun et al. |

OTHER PUBLICATIONS

Mark et al.; Post-Rendering 3D Warping; In Proceedings of 1997 Symposium on Interactive 3D Graphics, Providence, RI, Apr. 27-30, 1997, pp. 7-16.

Nilsson; "Foveated Real-Time Ray Tracing"; Retrieved from the Internet: URL:https://github.com/CaterHatterPillar/fov_rt_et [retrieved on May 4, 2017]; pp. 1-6.

Nilsson, "Foveated Real-time Ray Tracing," Retrieved from the Internet; URL:https//github.com/CaterHatterPillar/ov_rt_et; pp. 1-6 (retrieved May 4, 2017).

Springer et al., "Multi-Frame Rate Rendering and Display," IEEE Virtual Reality Conference 2007, Mar. 10-14, 2007, Charlotte, NC, pp. 195-202.

* cited by examiner

FOVEATED RENDERING

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. The graphics data may include "primitives" representing geometric shapes, which describe surfaces of structures in the scene. A common primitive shape is a triangle, but primitives may be other shapes and may be lines or points. Objects can be composed of one or more (e.g. hundreds, thousands or millions) of such primitives. As an example, graphics processing systems may implement a rasterisation technique for rendering images, whereby for each of the primitives, it is determined which pixels in the image the primitive affects and then those pixels are modified accordingly. Graphics processing systems implementing rasterisation techniques are well known in the art, and there are various different ways in which the rendering may be implemented, such as tile-based rendering or non tile-based rendering, immediate mode rendering and deferred rendering.

In some systems, sequences of images (or "frames") are rendered and displayed in real-time. The frame rate of the sequence of images will typically depend on the application for which the images are rendered. To give an example, a gaming application may send images for rendering at a frame rate of 25 frames per second, but other frame rates may be used in other examples. Generally, increasing the frame rate of the sequence of images to be rendered will increase the processing load on the graphics processing system.

Furthermore, different images can be rendered with different resolutions, e.g. by setting the number of pixels in the image, and a geometric level of detail (LOD) of image data to be rendered can also be set. The geometric LOD may set a limit on the smallest objects which will be rendered in the rendering system. Generally, increasing the number of pixels or geometric LOD in an image will provide greater detail in the image, which may increase the perceived quality of the image, but this will also tend to increase the processing load on the graphics processing system.

It may be desired to render images at a high resolution with a high geometric LOD in real-time with a high frame rate, but the processing requirements for achieving this might be impractical on some devices (e.g. mobile devices such as smart phones, tablets or head mounted displays) which might have limited processing resources and power supplies. To address this, the idea of foveated rendering may be used, as described below.

Human visual acuity varies significantly across the visual field, with most detail visible in a small foveal region of the retina. It is known that the foveal region is approximately 5° of the field of view, which may for example be on the order of 1% of a total display area on which an image is displayed. For example, FIG. 1 shows an image 102 which is to be displayed on a display, and the foveal region is denoted 104. FIG. 1 is not drawn to scale but it can be seen that the foveal region 104 can be much smaller than the whole image 102.

Gaze tracking (or "eye tracking") may be used to determine where a user is looking to thereby determine where the foveal region 104 is in relation to the image 102. The foveal region 104 can be rendered at a high resolution and high geometric LOD, whereas the rest of the image 102 can be rendered at a lower resolution and lower geometric LOD. The rendered foveal region 104 can then be blended with the rendering of the rest of the image 102 to form a rendered image. Therefore, in the periphery of the image 102, unperceived detail can be omitted such that fewer primitives may be rendered, at a lower pixel density. Since the foveal region 104 is generally a small proportion (e.g. ~1%) of the area of the image 102, substantial rendering computation savings can be achieved by reducing the resolution and geometric LOD of the periphery compared to the rendering of the foveal region. Furthermore, since human visual acuity decreases rapidly away from the foveal region, high image quality is maintained for the image as perceived by a user who directs their gaze at the centre of the foveal region 104.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some examples, foveated rendering is described for rendering an image whereby a ray tracing technique is used to render a region of interest of the image, and a rasterisation technique is used to render other regions of the image. The rendered region of interest of the image is then combined (e.g. blended) with the rendered other regions of the image to form a rendered image. The region of interest may correspond to a foveal region of the image. Ray tracing naturally provides high detail and photo-realistic rendering, which human vision is particularly sensitive to in the foveal region; whereas rasterisation techniques are suited for providing temporal smoothing and anti-aliasing in a simple manner, and is therefore suited for use in the regions of the image that a user will see in the periphery of their vision.

In examples described herein, both rasterisation and ray tracing can be used concurrently (or interchangeably) where both techniques may contribute to the final image. Inputs about a user's gaze position are provided and used to influence how a final image is formed using the rasterisation and ray tracing techniques. In this way, the user's perception of an incomplete render or rendering artifacts can be reduced, and/or rendering power can be reduced.

There is provided a processing system configured to render one or more images, the processing system comprising: ray tracing logic configured to process graphics data for one or more regions of interest of an image using a ray tracing technique; and rasterisation logic configured to process graphics data for one or more rasterisation regions of the image using a rasterisation technique, wherein the processing system is configured to form a rendered image using the processed graphics data for the one or more regions of interest of the image processed using the ray tracing technique and the processed graphics data for the one or more rasterisation regions of the image processed using the rasterisation technique. A region of interest may correspond to a foveal region of the image. For example, the one or more rasterisation regions may include one or more regions of the image which are not part of the one or more regions of interest. The processing system may further comprise gaze tracking logic configured to determine a gaze position for an image to be rendered, wherein a region of interest of the image is based on the determined gaze position, e.g. the region of interest may surround the determined gaze position such that it represents a foveal region.

There is provided a method of rendering one or more images, the method comprising: processing graphics data for one or more regions of interest of an image using a ray tracing technique; processing graphics data for one or more rasterisation regions of the image using a rasterisation technique; and forming a rendered image using the processed graphics data for the one or more regions of interest of the image processed using the ray tracing technique and the processed graphics data for the one or more rasterisation regions of the image processed using the rasterisation technique.

There is provided a processing system configured to render one or more images, the processing system comprising: first rendering logic configured to process graphics data for one or more first regions of an image using a first rendering technique; and second rendering logic configured to process graphics data for one or more second regions of the image using a second rendering technique, said first rendering technique being different to said second rendering technique, wherein the processing system is configured to form a rendered image using the processed graphics data for the one or more first regions of the image processed using the first rendering technique and the processed graphics data for the one or more second regions of the image processed using the second rendering technique. For example, the one or more second regions may include one or more regions of the image which are not part of the one or more first regions.

There is provided a non-transitory computer readable storage medium having stored thereon a computer readable description of an integrated circuit that, when processed in an integrated circuit manufacturing system, causes the system to manufacture a processing system comprising: ray tracing logic configured to process graphics data for one or more regions of interest of an image using a ray tracing technique; and rasterisation logic configured to process graphics data for one or more rasterisation regions of the image using a rasterisation technique, wherein the processing system is configured to form a rendered image using the processed graphics data for the one or more regions of interest of the image processed using the ray tracing technique and the processed graphics data for the one or more rasterisation regions of the image processed using the rasterisation technique.

There is provided a processing system configured to render one or more images, the processing system comprising: rendering logic configured to process graphics data to generate an initial image; region identification logic configured to identify one or more regions of the initial image; ray tracing logic configured to perform ray tracing to determine ray traced data for the identified one or more regions of the initial image; and update logic configured to update the initial image using the determined ray traced data for the identified one or more regions of the initial image, to thereby determine an updated image to be outputted for display.

There is provided a method of rendering one or more images at a processing system, the method comprising: processing graphics data to generate an initial image; identifying one or more regions of the initial image; performing ray tracing to determine ray traced data for the identified one or more regions of the initial image; and updating the initial image using the determined ray traced data for the identified one or more regions of the initial image, to thereby determine an updated image to be outputted for display.

There is also provided an integrated circuit manufacturing system comprising: a non-transitory computer readable storage medium having stored thereon a computer readable description of an integrated circuit that describes a processing system; a layout processing system configured to process the integrated circuit description so as to generate a circuit layout description of an integrated circuit embodying the processing system; and an integrated circuit generation system configured to manufacture the processing system according to the circuit layout description, wherein the processing system comprises: ray tracing logic configured to process graphics data for one or more regions of interest of an image using a ray tracing technique; and rasterisation logic configured to process graphics data for one or more rasterisation regions of the image using a rasterisation technique, wherein the processing system is configured to form a rendered image using the processed graphics data for the one or more regions of interest of the image processed using the ray tracing technique and the processed graphics data for the one or more rasterisation regions of the image processed using the rasterisation technique.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
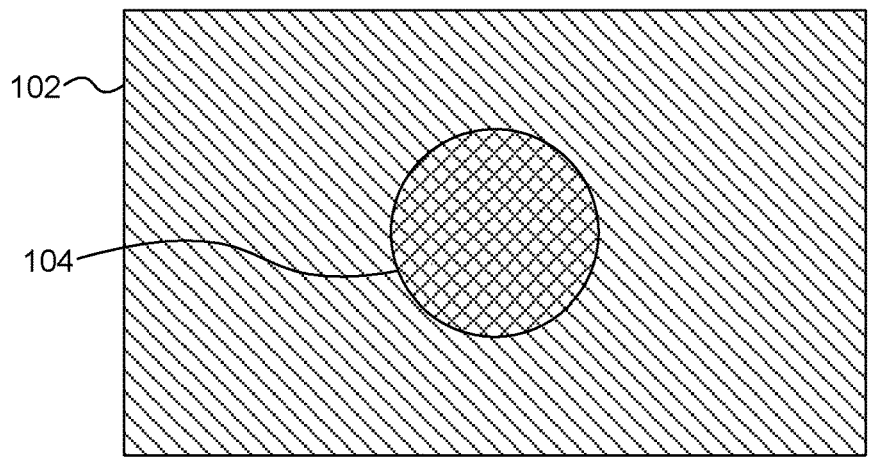
FIG. 1 shows an example of a foveal region within an image.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common refer-

DETAILED DESCRIPTION

Embodiments will now be described by way of example only.

In previous foveated rendering systems, the differences between the way in which the foveal region and the periphery of an image are rendered relate to the resolution or level of detail with which the regions of the image are rendered. In contrast, in examples described herein, different rendering approaches, e.g. different rendering techniques are used for rendering the foveal region and other regions of the image. The different rendering techniques may be suited for rendering the different regions of the image, such that different qualities of the different rendering techniques are matched to the way different regions of a field of view are processed by the human visual system. In general, graphics data for a first region (e.g. the foveal region) of an image is processed using a first rendering technique (e.g. ray tracing) and graphics data for a second region of the image (e.g. a peripheral region) of an image is processed using a second rendering technique (e.g. rasterisation). The first rendering technique is different to the second rendering technique. The second region (e.g. the peripheral region) may include one or more regions of the image which are not part of the first region (e.g. the foveal region). A rendered image can be formed using the processed graphics data for the first region (e.g. the foveal region) of the image processed using the first rendering technique (e.g. ray tracing) and the processed graphics data for the second region (e.g. the peripheral region) of the image processed using the second rendering technique (e.g. rasterisation). The graphics data for a region may comprise primitives to be rendered within that region. The terms "first" and "second" are used as identifiers here and do not impart any sequential meaning. Furthermore, referring to a "first region" and a "second region" does not imply that there are necessarily only two regions. Furthermore the word "region" does not imply contiguity. In this document, region is used to mean any subset of pixels, sub-pixels or samples within a buffer or image.

In some examples, the different rendering techniques may be used in different ways across different parts of the image based on the position of a region of interest (e.g. foveal region, or high-detail region) within the image. For example, a full low-detail image may be generated using a first rendering technique (e.g. rasterisation) and detail may be added to particular regions of the low-detail image using a second rendering technique (e.g. ray tracing). For example, high resolution, photo-realistic effects may be added to a foveal region of the low-detail image using the ray tracing technique, and/or the ray tracing technique may add high resolution detail into regions which are prone to aliasing, even in the periphery. Regions may be prone to aliasing if they have high frequency detail (e.g. where this "frequency" is in the spatial domain).

Examples of different rendering techniques which may be used for rendering regions of an image are rasterisation, ray tracing and ray casting. This makes pervasive use of the term ray tracing often to describe what others may refer to as ray casting. It is the intention of the authors to use ray tracing is a broad term that wholly encompasses ray casting. Rasterization, ray tracing, and ray casting all serve the purpose of determining which objects are visible to which pixels in the final image, either directly or through an indirect effect like a reflection. After the visibility determinations, shading calculations may be performed to compute the colour or light contribution from the identified objects to the appropriate pixels. Often this can be accomplished with a shader program. The shader programs used between the different rendering techniques can be shared but they can also be different shader programs specifically written to accommodate the rendering technique.

Rasterisation involves defining a viewpoint for a 3-D scene containing geometry and a pixel array to be rendered from the scene. In most rasterisation approaches, the geometry is reduced to triangular primitives, and those primitives are transformed into 2-D coordinates, with a depth value. It is determined which primitive is visible at each pixel (or part of a pixel), and the visible surface of that primitive is shaded. Rasterisation can easily parallelize computation, because each pixel is independent, and geometry can be streamed geometry through a rasterisation pipeline for processing. Rasterisation thus is well suited for time sensitive rendering applications, such as video games. However, it is difficult and time consuming to produce sophisticated rendering outputs using rasterisation.

Ray tracing methods are known in the art and aim to simulate the natural flow of light. For example, one or more rays may be considered to be "shot" from the viewpoint through each pixel of the image to be rendered and the rays are traced to an intersection with a primitive in the scene. Generally, a number of "bounces" of the rays off the geometry in the scene are determined, and effects such as refraction and surface roughness can be modelled. Ray tracing is particularly well suited for rendering the foveal region of an image because ray tracing tends to produce more realistic results than other rendering techniques. Since the human visual system has a high acuity in the foveal region, the perceived image quality of the foveal region tends to be higher if a ray tracing technique is used compared to if other rendering techniques are used (if other characteristics such as pixel density are the same). However, ray tracing is a complex process (often involving determining the effects of millions or billions of intersections between rays and primitives in a scene to render a single image), such that the processing resources required to render the whole of an image and display the image in real-time may not be available on many devices on which graphics processing systems are implemented, e.g. on mobile devices such as smart phones, tablets and virtual reality headsets. Therefore, in some examples described herein, ray tracing is used for rendering only the foveal region of an image, which tends to be on the order of 1% of the total image area. Therefore, the processing resources and the power consumption required for using the ray tracing for the foveal region are greatly reduced compared to ray tracing the whole of the image, to the extent that these methods can be implemented on many devices which would otherwise be incapable of rendering images by ray tracing in real-time at a high frame rate (e.g. at a frame rate above 10 frames per second). Furthermore, the main advantages of ray tracing over other rendering techniques (e.g. the higher image quality and greater photo-realism/visual fidelity) are achieved in the foveal region of the image, which is where the human visual system is particularly sensitive.

Some foveated rendering systems may use only ray tracing for the whole of the image, but may increase the ray density and/or the frame rate in the foveal region. However, these foveated rendering systems would have problems in the periphery of the image. In particular, the periphery of the image would be subject to temporal and spatial aliasing. Although the periphery of the human visual system is poor at processing fine details, the periphery is sensitive to aliasing, and in particular it is sensitive to temporal aliasing (e.g. flicker). It is difficult to address the aliasing problems in the periphery using a pure ray tracing approach without increasing the processing requirements of the periphery. However, as described in some examples below, a pure ray tracing approach or a pure ray casting approach could be used, e.g. wherein the sample density (i.e. the ray density) is varied across different parts of the image.

However, rasterisation techniques are better suited at addressing aliasing (both spatial aliasing and temporal aliasing) without the need for complex processing. In particular, the processing requirements and power consumption used to address aliasing in a rasterisation renderer are lower than those in a ray tracing renderer. Away from the foveal region, the human visual system is less sensitive to detail, but is sensitive to aliasing (both spatial and temporal). Compared to ray tracing, rasterisation may provide lower detail images but is better suited at addressing spatial and temporal aliasing. Therefore, rasterisation is better suited than ray tracing for rendering the periphery of an image. However, to reiterate what is described above, in the foveal region, the human visual system is more sensitive to detail; and compared to rasterisation, ray tracing tends to provide higher detail images with greater visual fidelity, so ray tracing is better suited than rasterisation for rendering the foveal region of an image. In some examples described herein, ray tracing is used to render the foveal region of an image and rasterisation is used to render other regions of the image. In this way, the rendering techniques for rendering particular regions of the image are matched to characteristics of the human visual system.

In some examples, ray tracing could be used for rendering multiple regions of an image, i.e. there may be multiple regions of interest. For example, there may be multiple users of the rendering system and regions of interest may correspond to the foveal regions of each of the users. In another example, some non-foveal regions may be considered to be "regions of interest" in the sense that those regions may benefit from detailed rendering, such that there is a benefit to rendering those regions using ray tracing. In other words, high detail rendering outside the foveal region may be considered to be useful. In particular, some research suggests that human perception in some peripheral regions is capable of recognizing regions of high frequency edges and transitions even though it is not capable of perceiving the details in those regions to the same extent as in the foveal region. For example, an edge-aware filter (e.g. a Sobel filter) may be implemented over a complete rasterized image, and then a ray tracing technique may process rays in the areas (i.e. regions of interest) where some high frequencies are detected (either high frequency in image-space, or high frequency in the time domain) to add detail to those areas of the image. The extra detail added by the ray tracing process may provide improved accuracy, so it may reduce the perception of aliasing in the non-foveal regions of a rendered image.

Figure 2:
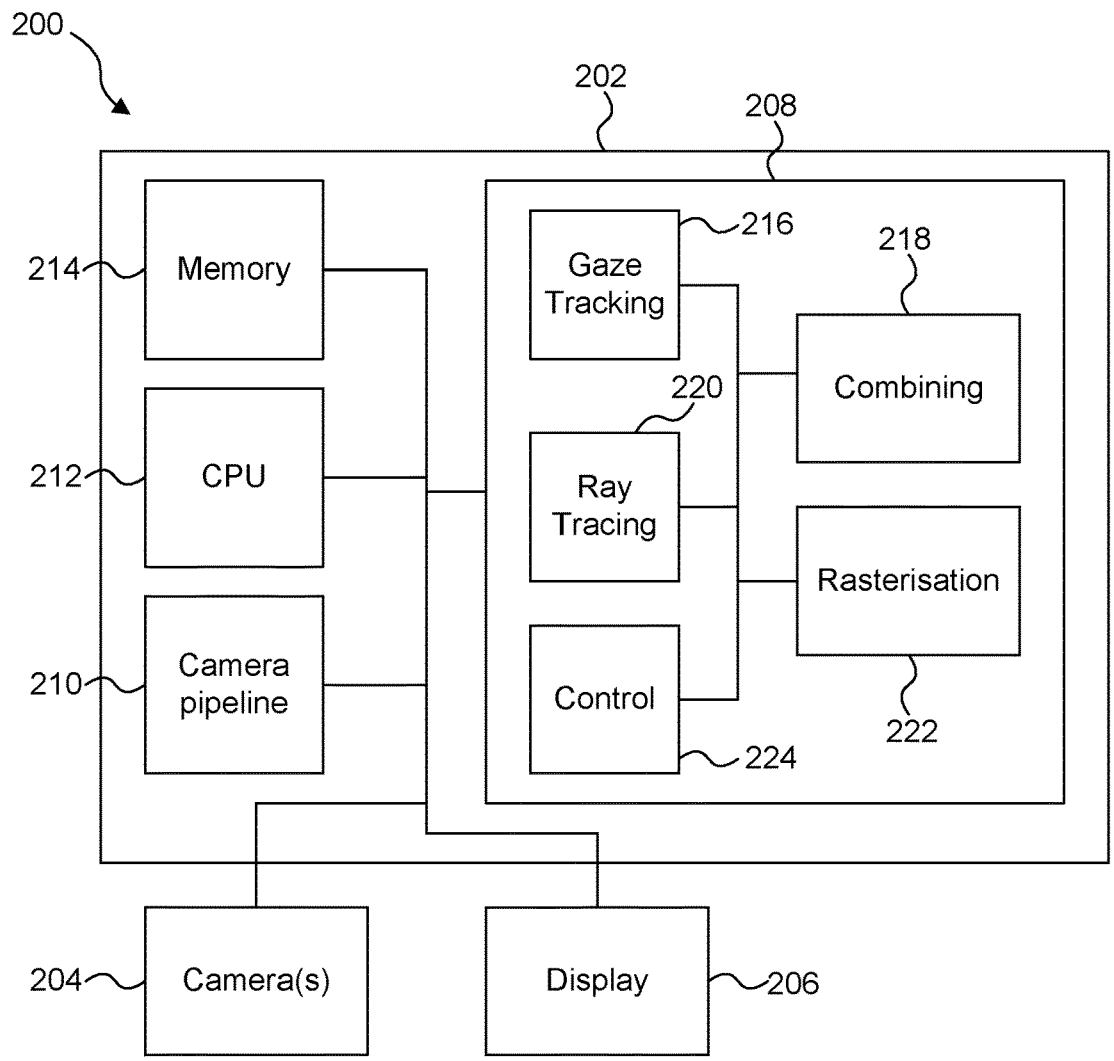
FIG. 2 shows a system including a processing system according to embodiments described herein.

FIG. 2 shows a system 200 including a processing system 202, one or more cameras 204 and a display 206. The processing system 202 may be implemented as a System on Chip (SOC). The processing system 202 comprises a graphics processing unit (GPU) 208, a camera pipeline 210, a Central Processing Unit (CPU) 212 and memory 214 which are coupled via a communications bus. The camera(s) 204 and the display 206 may also be coupled to the communications bus of the processing system 202 such that they can communicate with the GPU 208, the camera pipeline 210, the CPU 212 and the memory 214. The GPU 208 comprises gaze tracking logic 216, combining logic 218, ray tracing logic 220, rasterisation logic 222 and control logic 224. The different logic blocks of the GPU 208 may be implemented in hardware, software or any combination of thereof. Furthermore, the different logic blocks of the GPU 208 are represented in FIG. 2 as separate blocks, but in some implementations, they may share some resources of the GPU 208, such as computation units and local memories, etc.

Figure 3:
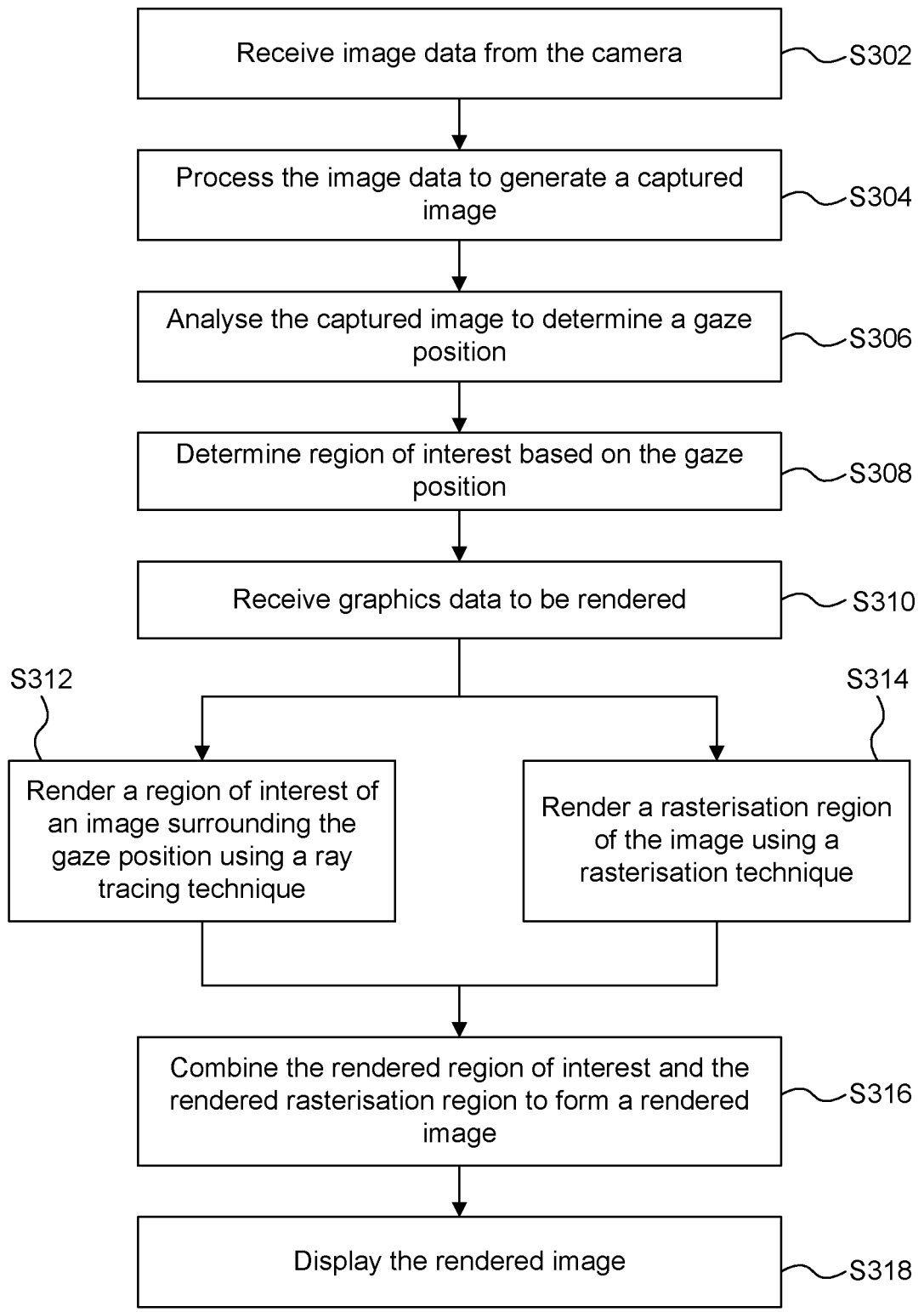
FIG. 3 is a flow chart showing a method of rendering one or more images in a processing system.

FIG. 3 is a flow chart showing an example method of rendering one or more images in the processing system 202. The images are displayed on the display 206 in real-time as they are rendered, for a user to view. The camera 204 is arranged to capture images of the user looking at the display 206 on which the images are rendered.

In step S302 the camera pipeline 210 receives image data from the camera 204. In step S304 the camera pipeline 210 processes the image data to generate a captured image. The camera pipeline 210 may use known techniques to process the image data and may include many different processes, such as one or more of: filtering, sharpening, black level correction, white balancing, defective pixel fixing, demosaicing, lateral chromatic aberration correction, denoising, gamut mapping, tone mapping, colour enhancement, etc. The camera pipeline 210 may be implemented in hardware, software or any combination thereof.

The captured image is provided from the camera pipeline 210 to the gaze tracking logic 216 of the GPU 208, either via the memory 214 or directly on the communications bus in the processing system 202 without going via the memory 214. Since the camera pipeline 210 and the gaze tracking logic 216 are implemented on the same processing system 202, which may be implemented as an SOC, the latency between the camera 204 capturing image data for an image and the image being provided to the gaze tracking logic 216 can be very low. In particular, the latency may be lower than if the camera pipeline 210 and gaze tracking logic 216 were implemented on different chips, or on different devices.

In step S306 the gaze tracking logic 216 analyses the captured image to determine a gaze position. The gaze position is determined for an image to be rendered and displayed on the display 206, and is a position within the image at which the user is looking. In particular, the gaze tracking logic 216 is provided with information regarding the position of the display 206 (e.g. in a configuration step), and the gaze tracking logic 216 identifies the position of the eyes of a user in the captured image. With these pieces of information the gaze tracking logic 216 can determine the gaze position. Methods for performing gaze tracking are known in the art, and as such, details of the gaze tracking performed by the gaze tracking logic 216 are not described in detail herein.

Determining the gaze position at a particular time and then providing this gaze position to the control logic means that there will be a finite latency between determining the gaze position and using the determined gaze position. Therefore, in some examples, the gaze tracking logic 216 may be supplemented with a predictive model that may be used to anticipate gaze movement, such that it may be possible to reduce or even completely remove the latency between determining the gaze position and using the gaze position. The predictive model could make use of additional sources of information including the screen-space location of moving objects, the location of information pertinent to the user, e.g. visible text, the previous gaze positions, the scene objects visible at prior gaze positions (e.g. to predict the eyes tracking an object during head movement), a momentum-based model for eye movement, etc. The predictive model could be implemented with a set of rules or heuristics, and/or it could be implemented with a neural network. Using the predictive model it may be possible to prioritize regions of interest and then render detail in those regions on an on-going basis as processing time permits, before the frame data must be provided for display. This can be particularly beneficial when the processing system is used in a virtual reality system because latency in the gaze determination is known to be a particular problem with virtual reality systems.

Steps S302 to S306 of the example shown in FIG. 3 use a camera to determine the gaze position. However, in other examples, an eye tracking system may determine the gaze position without implementing a camera or a camera pipeline per se. That is, eye tracking systems do not necessarily include an image sensor that would typically be referred to as a "camera".

In step S308 the control logic 224 determines one or more regions of interest based on the gaze position. In the example shown described with reference to the flow chart of FIG. 3 there is a single region of interest and a single rasterisation region, but in some other examples there may be a plurality of regions of interest and/or a plurality of rasterisation regions. The region(s) of interest indicates the region(s) of an image which will be rendered using the ray tracing technique. For example, a region of interest may correspond to a foveal region of the image. Therefore in this case, the region of interest can be determined as a region surrounding the determined gaze position. The region of interest of the image may be centred on the determined gaze position. The size and shape of a region of interest may be different in different implementations, as described in more detail below.

As an example, the size of the region of interest may correspond to a 5° field of view from the user's viewpoint. In this way, the region of interest would correspond to a typical foveal region of the user's field of view. In order to set the size of the region of interest to correspond to a 5° field of view, the control logic 224 can use information regarding the size of the display 206 on which a rendered image will be displayed, and the distance from the user's viewpoint to the display 206. Information regarding the size of the display 206 can be provided to the control logic 224 and stored in a memory local to the control logic 224. An indication of a typical distance from the user's viewpoint to the display 206 may be stored in a local memory of the control logic 224 as well, and will depend upon the setup of the system, e.g. the user may be at a desk with the display 206 approximately 50 cm away, or the display may be integrated in a virtual reality headset such that the display is approximately 3 cm away from the user's eyes. In some examples, the captured image may be analysed (e.g. by the gaze tracking logic 216) to estimate a distance between the user's viewpoint and the display 206.

In step S310 graphics data (e.g. primitive data) describing scene geometry for an image to be rendered is received at the GPU 208. For example, an application (e.g. a gaming application) may be running on the CPU 212 and may send primitive data to the GPU 208 for images to be rendered and output to the display 206 for display in real-time. Image data for a sequence of images (or "frames") may be received at the GPU 208 to be rendered and displayed in sequence. The GPU 208 renders the image(s) according to a foveated rendering process, as described herein.

Steps S312 and S314 may be performed concurrently, or in series, in the GPU 208 for an image. In step S312 the ray tracing logic 220 renders the region of interest of the image using a ray tracing technique. The rendering in step S312 involves processing graphics data for the region(s) of interest according to a ray tracing technique, e.g. by processing primitive data for primitives which intersect rays that pass through the region(s) of interest. In step S314 the rasterisation logic renders a rasterisation region of the image using a rasterisation technique. The rendering in step S314 involves processing graphics data for the rasterisation region(s) according to a rasterisation technique, e.g. by processing primitive data for primitives which are present within the rasterisation region(s). The rasterisation region includes one or more regions of the image which are not part of the region of interest. For example, with reference to FIG. 1, the region of interest may be the foveal region 104. The rasterisation region may include all of the image 102 which is not part of the region of interest 104. Furthermore, the rasterisation region may include some of the region of interest 104. In that case, the rasterisation region includes an overlapping region which overlaps with at least some of the region of interest. For example, the rasterisation region may cover the whole of the image 102. In other examples, the rasterisation region may cover the whole of the image except a sub-region within the region of interest, e.g. a sub-region at the centre of the region of interest.

Methods of performing ray tracing and of performing rasterisation are known in the art, and as such detailed descriptions of the operation of the ray tracing logic 220 and the rasterisation logic 222 are not provided herein. However, it is noted that the ray tracing logic 220 and the rasterisation logic 222 may each comprise computation units, local memories (e.g. caches and registers) and control logic such as sequencing logic and fetching logic for performing the various operations involved in the different rendering techniques. In some examples, the ray tracing logic and the rasterisation logic 222 may be implemented separately on the GPU 208. However, in other examples, as described in more detail below with reference to FIG. 8, the ray tracing logic 220 and the rasterisation logic 222 may share processing resources on the GPU 208, and the GPU 208 may be considered to be a "hybrid" GPU. In such hybrid systems, the same shader programs may be executed on primitive fragments irrespective of whether a visible fragment has been identified by rasterisation or by a ray tracing technique.

In the example shown in FIG. 3, the ray tracing logic 220 and the rasterisation logic 222 each determine image values at sample positions of the image being rendered. There may be a one to one relationship between the sample positions and the pixels of the image, such that the image values are pixel values. In other examples, there may be multiple sample positions for each pixel position of the image, such that multiple image values can be combined to determine the final pixel values of the image. In further examples, the sample positions may be more sparse than the pixels in which case the pixel values can be interpolated between neighbouring samples. In some other examples, as described below with reference to FIG. 7, rather than determining pixel values from scratch, the ray tracing logic may determine updates to be made to pixel values determined by the rasterisation logic.

In step S316 the combining logic 218 combines the rendered region of interest of the image rendered using the ray tracing technique and the rendered rasterisation region of the image rendered using the rasterisation technique to form a rendered image.

In a very simple example, the rendered region of interest can be overlaid on top of the rendered rasterisation region to form the rendered image. In other words, within the region of interest, the results of the ray tracing are used for the rendered image, and outside of the region of interest the results of the rasterisation are used for the rendered image. This combination is very simple to perform, but it may result in a noticeable line around the edge of the region of interest in the rendered image. The section of the rendered image around the edge of the region of interest may be filtered (e.g. with a Gaussian filter) to thereby smooth out the transition between the region of interest and the other regions of the image.

In other examples, where the region of interest and the rasterisation region overlap in an overlapping region, the combining logic 218 may blend, in a blending region within the overlapping region, image values determined by the ray tracing logic 220 and image values determined by the rasterisation logic 222.

Figure 4A:
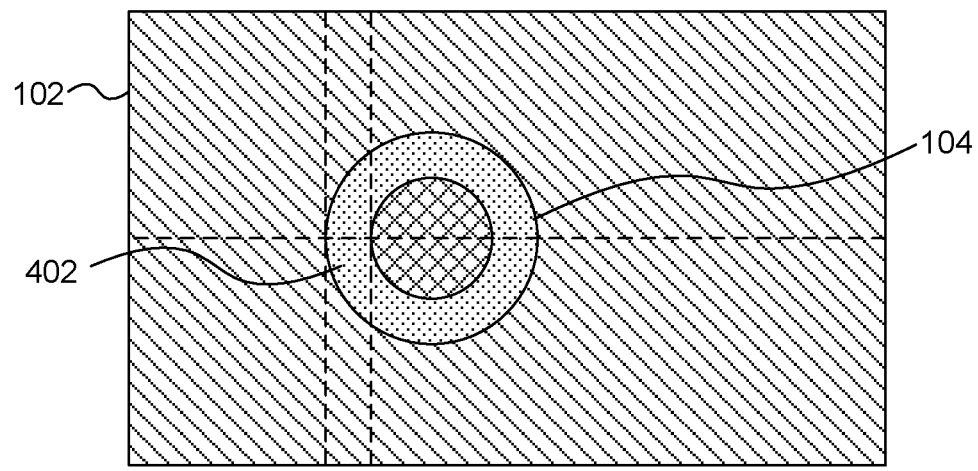
FIG. 4a shows an example of a foveal region and a blending region within an image.

FIG. 4a shows an example of an image 102 which includes a foveal region 104. It is noted that the foveal region 104 is not in the centre of the image 102 in this example. This may be because the user's gaze is not directed towards the centre of the image 102. There is a blending region 402 which is part of the overlapping region between the rasterisation region and the foveal region 104. In this case the rasterisation region may cover the whole of the image 102 or in another example may cover the whole of the image 102 except the portion of the foveal region 104 which is not included in the blending region 402. In this example, outside of the blending region 402 and outside of the foveal region 104, the image values of the rendered image are the image values determined by the rasterisation logic 222; in the foveal region 104 which is not part of the blending region 402, the image values of the rendered image are the image values determined by the ray tracing logic 220; and within the blending region 402 the image values of the rendered image are a blend of the image values determined by the rasterisation logic 222 and the image values determined by the ray tracing logic 220.

For example, at each of a plurality of sample positions within the blending region 402, the blend is a weighted sum of the image value at the sample position determined by the ray tracing logic and the image value at the sample position determined by the rasterisation logic. The weight of the weighted sum for a sample position may depend upon a distance of the sample position through the blending region 402. For example, the image value $I_r(x)$ of the rendered image at a distance x through the blending region 402 may be determined according to the equation:

$$I_r(x)=\alpha(x)I_{Rast}(x)+(1-\alpha(x))I_{RT}(x)$$

where $I_{Rast}(x)$ is the image value rendered by the rasterisation logic 222 at the distance x through the blending region 402, $I_{RT}(x)$ is the image value rendered by the ray tracing logic 220 at the distance x through the blending region 402, and $\alpha(x)$ is a blending factor at the distance x through the blending region 402. The value of x decreases towards the centre of the foveal region 104.

Figure 4B:
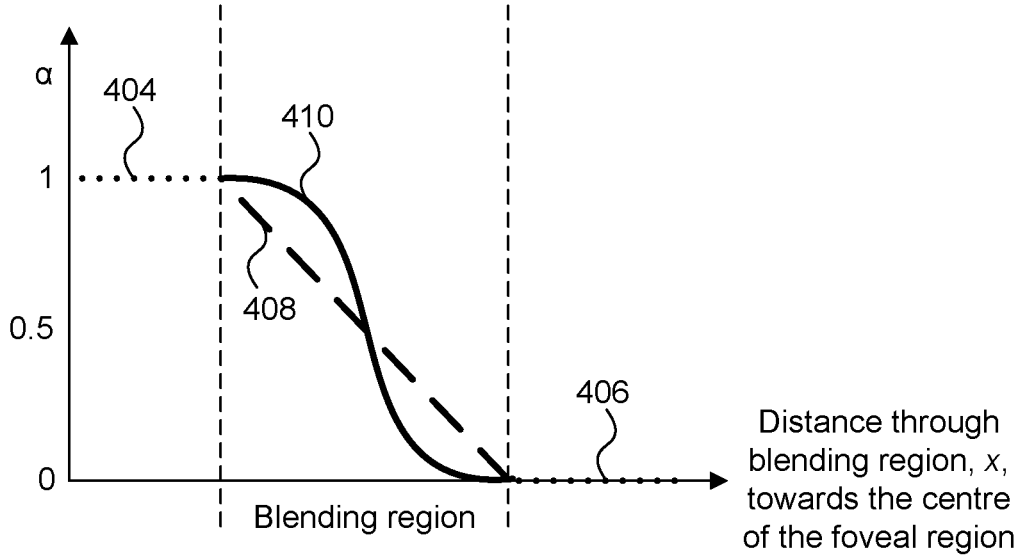
FIG. 4b is a graph illustrating a blending factor to be used in the blending region.

FIG. 4b is a graph illustrating the values of the blending factor $\alpha(x)$ to be used in a section of the blending region 402. To the left of the blending region in the example shown in FIGS. 4a and 4b, i.e. outside of the foveal region 104, the blending factor $\alpha(x)$ has a value of 1, as denoted at 404, such that $I_r(x)=I_{Rast}(x)$. Alternatively, the blending factor $\alpha(x)$ may be undefined in this region, and the rendered image values are simply taken to be the image values determined by the rasterisation logic 222. To the right of the blending region in the example shown in FIGS. 4a and 4b, i.e. outside of the blending region 402 and within the foveal region 104, the blending factor $\alpha(x)$ has a value of 0, as denoted at 406, such that $I_r(x)=I_{RT}(x)$. Alternatively, the blending factor $\alpha(x)$ may be undefined in this region, and the rendered image values are simply taken to be the image values determined by the ray tracing logic 220. Within the blending region, the blending factor $\alpha(x)$ is in the range $0 \leq \alpha(x) \leq 1$. The blending factor $\alpha(x)$ is preferably continuous with the values at 404 and 406 and preferably varies smoothly over the blending region to thereby reduce the appearance of artefacts occurring in the blending region in the rendered image. There are many examples of blending factors which would meet these criteria. For example, the blending factor may vary linearly across the blending region as represented by the dashed line 408. This is a simple example and can be implemented with very little processing complexity. As another example, the first derivatives of the blending factor $\alpha(x)$ may be controlled to be continuous at the edges of the blending region, to further reduce perceptible artefacts at the boundaries of the blending region. Line 410 in FIG. 4b shows an example of a blending factor $\alpha(x)$ which meets these criteria, and may for example be represented as a cubic function across the blending region.

In the example shown in FIG. 4a the blending region covers only part of the foveal region 104, but in some other examples the blending region may cover the whole of the foveal region. Furthermore, in some examples the a value might not drop to zero at any position in the image being rendered.

In the examples described above the region of interest 104 covers a small proportion of the image 102. However, in other examples, a region of interest may cover the entire image, and a rasterisation region may also cover the entire image. In this example, the blending region may cover the entire image and the blending factor may vary across the image. For example, the blending factor may vary across the image such that in a foveal region the final rendered image is more strongly weighted to the image values rendered by the ray tracing logic $I_{RT}(x)$, whilst away from the foveal region the final rendered image is more strongly weighted to the image values rendered by the rasterisation logic $I_{Rast}(x)$.

In step S318 the processing system sends the rendered image to the display 206 and the image is displayed thereon. The method shown in FIG. 3 may be performed for each image of a sequence of images to be rendered in real-time. In some other examples, the steps S302 to S308 are not performed for every image that is rendered and displayed in steps S310 to S318.

In the method shown in FIG. 3, the rasterisation logic renders the rasterisation region, the ray tracing logic renders the region of interest and the combining logic combines the two rendered regions to form the rendered image. However, in other examples, there might not be a separate combining step or separate combining logic. For example, ray tracing and rasterisation may work together on the same region. As an example, the rasterisation process could run across the entire frame and then the ray tracing could augment the rasterized areas with additional detail. In this way, the result of the ray tracing stage may be a final rendered image without the need for a separate blending stage. Ray tracing and rasterisation may run concurrently, or in some cases rays could be triggered by the output from rasterisation processing. The combining step could involve the use of an explicit set of filters (e.g. in the combining logic as in the example described above with reference to the flow chart shown in FIG. 3), or the combination of the rasterisation and ray tracing might just result from the implementation of the ray tracing process such that there would be no explicit step or pipeline stage for the "combining".

The rendering techniques do not need to be synchronized. For example, a low detail rendering of the entire image can be performed using either ray tracing or rasterization, and then subsequent rendering operations can augment regions of the image with higher levels of detail. The high detail rendering may occur multiple times and across multiple displayed frames continuing to augment the image before the low detail image is required to be re-rendered.

Figure 5:
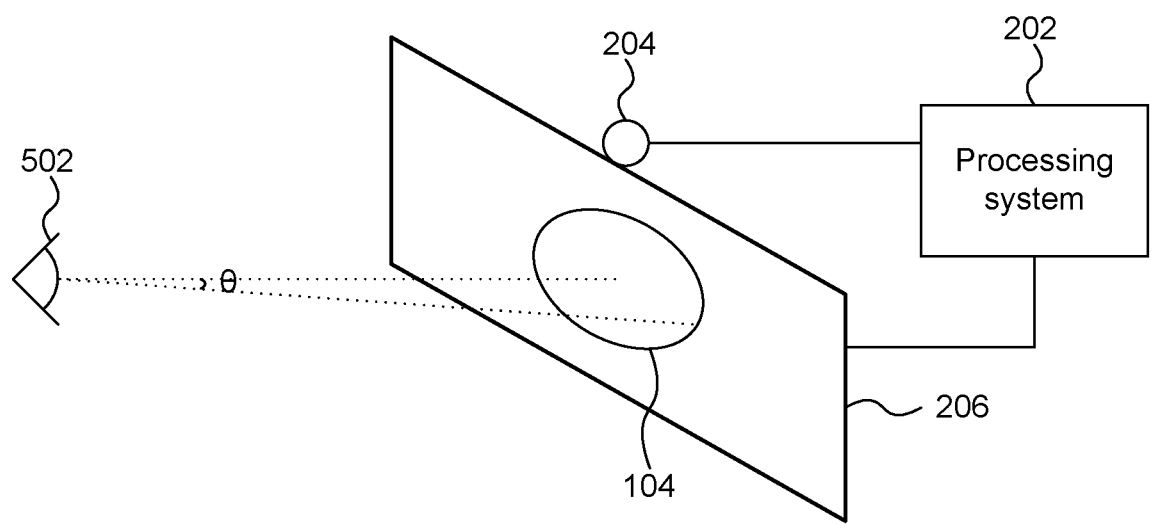
FIG. 5 illustrates an environment in which a processing system according to embodiments described herein is implemented.

FIG. 5 shows an environment in which the processing system 202 is implemented. FIG. 5 shows the display 206 with the camera 204 positioned in the proximity of the display 206 such that it can capture images of the user looking at the display 206. A viewpoint of the user 502 is shown in FIG. 5. The processing system 202 is coupled to the camera 204 and to the display 206. The foveal region 104 is represented on the display 206 and an angle θ of the field of view of the foveal region 104 is represented being the angle between the centre of the foveal region 104 and the edge of the foveal region 104. As described above, the angle θ may be set to be approximately 5° such that the region 104 accurately represents a foveal region.

Figure 6A:
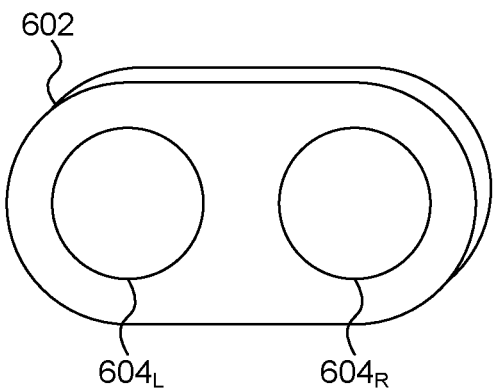
FIG. 6a shows a headset for use in a virtual reality system.
Figure 6B:
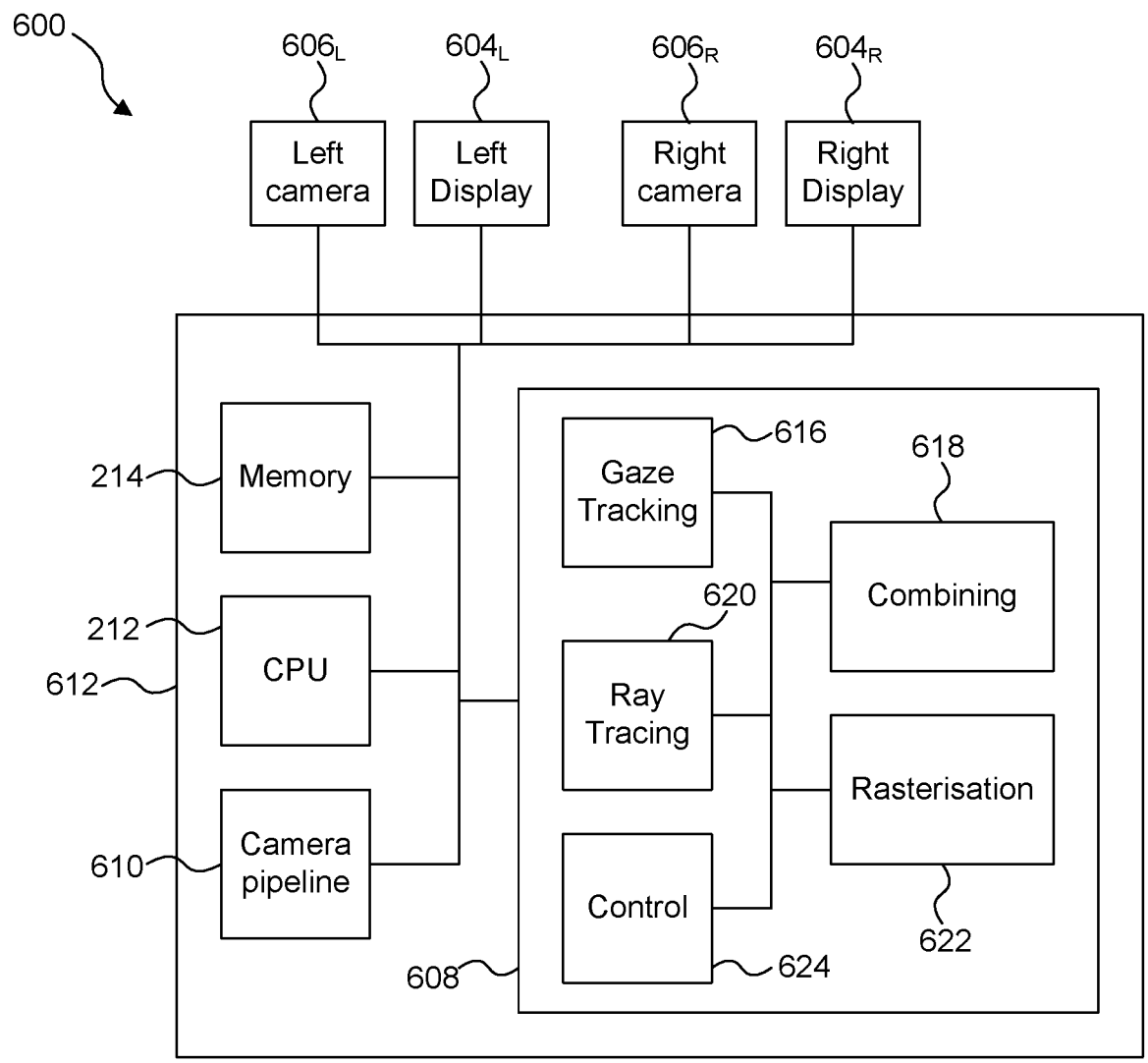
FIG. 6b illustrates a virtual reality system in which a processing system according to embodiments described herein is implemented.

FIGS. 6a and 6b illustrate how the processing system can be included in a virtual reality system 600. In particular, FIG. 6a shows a headset 602 for use in a virtual reality system. The headset comprises two displays $604_L$ and $604_R$. The headset is arranged to be worn by a user, such that the display $604_L$ is in front of the user's left eye and the display $604_R$ is in front of the user's right eye. The headset may further include cameras and a processing system, as described herein. Ideally, a virtual reality system would display frames having a high resolution, a high frame rate and with no missed frames. The foveated rendering examples described herein allow ray tracing to be used to render foveal regions of images for use in a virtual reality system.

FIG. 6b is a schematic diagram of the virtual reality system 600 which comprises the left and right displays $604_L$ and $604_R$, two cameras $606_L$ and $606_R$ and a processing system 612. The camera $606_L$ is arranged to capture images of the user's left eye and the camera $606_R$ is arranged to capture images of the user's right eye.

The processing system 612 is similar to the processing system 202 described above and includes a GPU 608, a camera pipeline 610, a CPU 212 and a memory 214. The GPU 608 comprises gaze tracking logic 616, combining logic 618, ray tracing logic 620, rasterisation logic 622 and control logic 624. The elements of the processing system 612 are similar to the elements of the processing system 202 described above, but they are slightly different due to the presence of two cameras ($606_L$ and $606_R$) and two displays ($604_L$ and $604_R$). In particular, the camera pipeline 610 will receive image data from both of the cameras $606_L$ and $606_R$ and will generate two captured images which are passed to the gaze tracking logic 616. The gaze tracking logic 616 analyses the captured images to determine two gaze positions: one for the right image and one for the left image. The ray tracing logic 620 and rasterisation logic 622 will render their respective regions of images as described above, but in the virtual reality system 600, two images are rendered: a left image to be displayed on the display $604_L$ and a right image to be displayed on the display $604_R$. The gaze positions for the two images may be slightly different. Furthermore, the images to be rendered may be slightly different for the right and left eye, e.g. to give 3-D effect. In a virtual reality system images are warped for display on the displays $604_L$ and $604_R$ to account for Head Mounted Display (HMD) lens distortion. In some examples, the warping process is incorporated as a natural part of the ray tracing rendering in the ray tracing logic 620, thereby avoiding an additional step of applying warping to already rendered image values in the foveal region.

Virtual reality has extremely high performance requirements, so the foveated rendering methods described herein can substantially improve the user experience, allowing for significant quality improvements in the foveal region by rendering this region with a ray tracing technique, while also increasing the quality of temporal and spatial antialiasing in the visual periphery, which is highly sensitive to flicker, by rendering this region with a rasterisation technique. Furthermore, this is achieved without increasing the processing complexity or power consumption by as much as with a purely ray traced rendering system.

Figure 7:
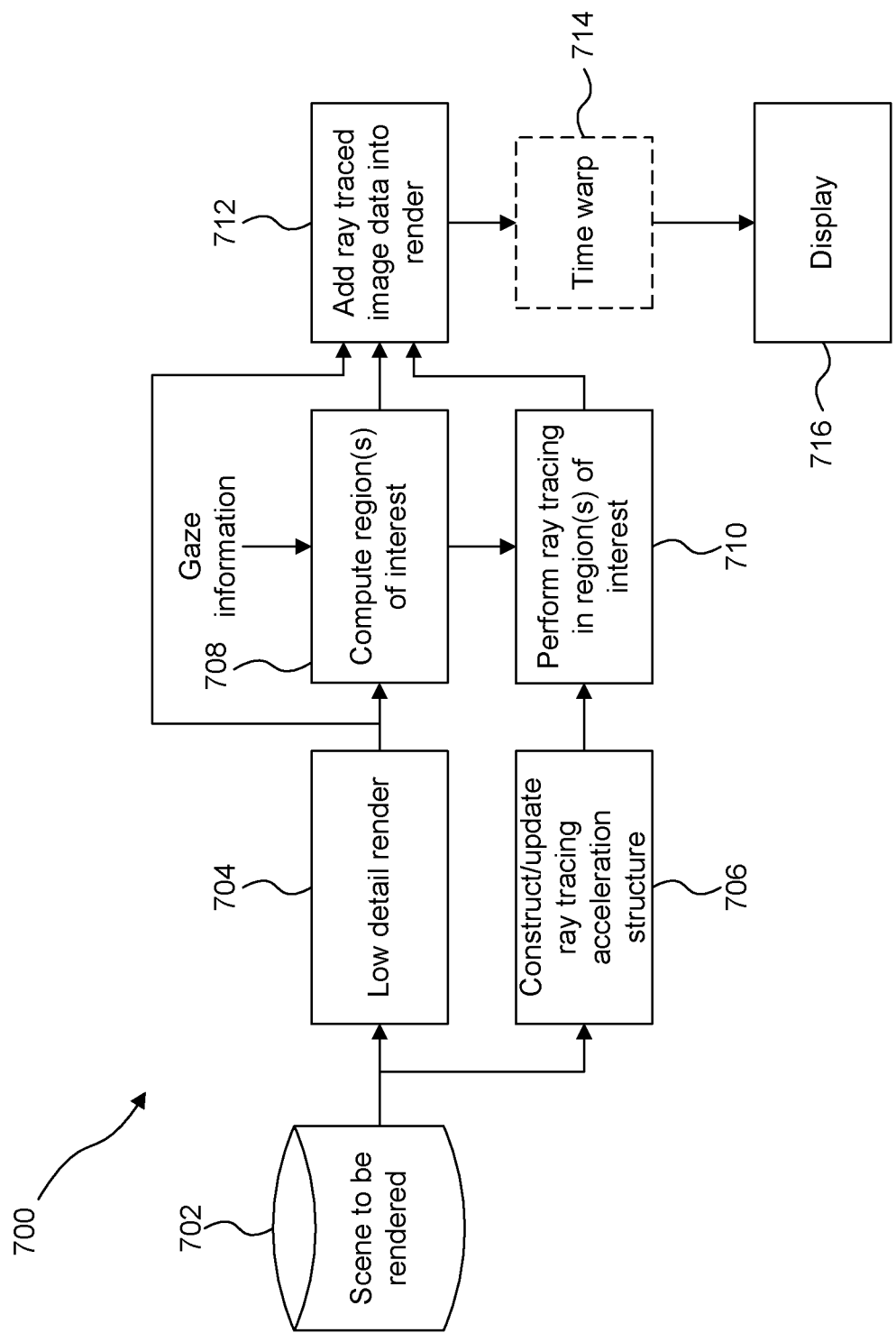
FIG. 7 illustrates a system where image information from a low detail and low frame-rate rendering is combined with image information from ray tracing at a faster frame-rate to produce a high frame-rate image that responds to changes in gaze.

FIG. 7 illustrates a processing system 700 where image information from a low detail and low frame-rate rendering is combined with image information from ray tracing at a faster frame-rate to produce a high frame-rate image that responds to changes in gaze. FIG. 7 shows a scene database 702 which stores scene geometry (e.g. primitive data describing primitives of objects in a scene to be rendered). The system also comprises rendering logic 704, acceleration structure building logic 706, region identification logic 708, ray tracing logic 710, update logic 712 and a display 716. The system 700 might also include time warping logic 714 in some examples. The logic blocks 704 to 714 may be implemented in hardware, software, firmware or any combination thereof.

In operation, the graphics data describing a scene to be rendered (e.g. scene geometry made up of primitives describing objects in the scene) is provided from the database 702 to the rendering logic 704 and to the acceleration structure building logic 706. The rendering logic 704 processes the graphics data to generate an initial image, which can be provided to the region identification logic 708, and to the update logic 1012. In the example shown in FIG. 7, the initial image is a low-detail image, i.e. it is a lower detail image than a final image which will be outputted for display. The rendering logic 704 may for example use a rasterisation technique to generate the initial image. However, in other examples, the rendering logic 704 may use a ray tracing technique to generate the initial image. If the rendering logic 704 uses a ray tracing technique to generate the initial image then it may receive the acceleration structure from the acceleration structure building logic 706. As explained in more detail below with reference to FIG. 10, there may be more than one acceleration structure, e.g. a low-detail acceleration structure and a high-detail acceleration structure. It may be the case that the rendering logic 704 receives the low-detail acceleration structure whereas the ray tracing logic 710 receives the high-detail acceleration structure.

The region identification logic 708 is configured to identify one or more regions of the initial image. The identified regions are regions for which ray traced data is to be computed (i.e. regions in which more rays are to be processed by the ray tracing logic 710) or regions for which more rays are to be traced (i.e. regions where the ray density is to be increased). In other words, the region identification logic 708 detects where detail is needed or desired in the image. In particular, the region identification logic 708 receives gaze information, e.g. an indication of a gaze position from gaze tracking logic such as 216 or 616. The region identification logic 708 may identify a region around a gaze position, or regions around anticipated future gaze positions, thereby representing a foveal region of the image. Furthermore, the region identification logic 708 may analyse the initial image in order to identify one or more regions within the initial image. For example, regions of high-frequency detail may be identified. In this sense, the frequency is a spatial frequency. For example, the region identification logic 708 may filter the initial image to identify screen-space frequency of image luminance to trigger more rays to higher frequency regions. Areas of high-frequency detail are prone to aliasing, so it can be useful to add some ray traced image data into these areas, even if they are not in the foveal region. This is because, as mentioned above, humans are sensitive to aliasing, even in the periphery of their view. The region identification logic 708 might identify regions for which ray traced image data is to be added for other reasons. For example, the centre of the image may be identified even if it is not in the foveal region and not in a high-detail region. In some examples, information from the rendering performed by the rendering logic 704 may be used to identify regions. For example, mesh edges or large changes in depth may be identified and used to identify areas in the image where the ray tracing could be used to provide anti-aliasing. As another example, regions corresponding to objects with a particular depth in the image may be identified, such that depth of field effects can be added by the ray traced data. As another example, a region corresponding to a particular object in a scene (e.g. a character in a game) may be identified such that ray traced data is added to the particular object even if the particular object is not in the foveal region or in high-detail. It will be apparent that there can be other reasons for the region identification logic 708 to identify a region. Indications of the identified regions are passed from the region identification logic 708 to the ray tracing logic 710 and to the update logic 712.

The acceleration structure building logic 706 is configured to determine an acceleration structure representing the graphics data of geometry in a scene of which an image is to be rendered. The acceleration structure may be hierarchical, and may be referred to as a "hierarchy". Methods of constructing an acceleration structure from the geometry data for the scene to be rendered are known in the art. The acceleration structure building logic 706 may construct the acceleration structure independently for each image. Alternatively, where the images being rendered represent frames of a sequence of frames, the acceleration structure building logic 706 may determine the acceleration structure for a current frame by updating the acceleration structure for the preceding frame. Consecutive frames in a sequence of frames are likely to have similar geometry in the scenes being rendered, so it can be substantially less computation to update the acceleration structure for the preceding frame than to construct an acceleration structure from scratch. The ray tracing logic 710 has access to the acceleration structure which is determined for the current image by the acceleration structure building logic 706.

The ray tracing logic 710 is configured to perform ray tracing to determine ray traced data for the identified one or more regions of the initial image. In some examples, the ray tracing logic 710 may perform ray tracing for the whole of the image but the density of rays that are processed may be increased in the identified regions. Methods for performing ray tracing are known in the art and typically includes performing intersection testing of rays against the geometry in the scene, as represented by the acceleration structure, and then executing shader programs on intersection hits. The execution of a shader program may result in secondary rays which can then be intersection tested and may result in further shader program instances being executed. The shader programs may be used to determine visual effects in the scene such as reflections, shadows, global illumination, etc. The characteristics of the incident lighting, as determined by a shader program, may contribute to the determination of regions of interest. The ray tracing may be performed at a higher resolution than the resolution of the low-detail image determined by the rendering logic 704. The results of the ray tracing are passed to the update logic 712.

The update logic 712 receives the initial image from the rendering logic 704. The update logic 712 also receives, from the region identification logic 708, the indications of the identified regions for which ray traced image data is to be added to the initial image. The update logic 712 also receives, from the ray tracing logic 710, the ray traced image data to be added to the initial image. The update logic 712 is configured to update the initial image using the determined ray traced data for the identified one or more regions of the initial image, to thereby determine an updated image. The updated image has detailed lighting effects in the identified regions provided by the ray traced image data. However, outside of the identified regions the updated image does not include the detailed lighting effects, so the processing burden of producing the updated image is lower than producing an image with detailed lighting effects across the whole image. This enables the image to be generated in in real-time on devices with tight constraints on processing resources and size, such as mobile devices (e.g. smart phones, tablets, laptops, etc.). The updated image outputted from the update logic 712 is suitable for display.

In some embodiments, the time warp logic 714 is not included and the updated image is passed to the display 716 for display thereon.

The rendering logic 704 and the ray tracing logic 710 may be configured to operate asynchronously. For example, the ray tracing logic 710 may operate at a faster rate than the rendering logic 704. For example, the rendering logic 704 may operate at 60 Hz and the ray tracing logic may operate at 240 Hz. In this way, for a sequence of frames, the rendering logic 704 generates an initial image $\frac{1}{60}$ seconds after the preceding initial image was generated. However, the ray tracing logic can determine ray traced data to be used to update an initial image at a rate of 240 times per second. Therefore, in this example, a particular initial image can be updated four times by different ray traced image data before the next initial image in the sequence is generated. This allows the processing system 700 to give the impression of a faster frame rate than the rendering logic 704 operates at (e.g. 240 Hz rather than 60 Hz). This is particularly useful if the processing system 700 is to be used in a virtual reality system. In order for users to have the impression of continuous motion, the frame rate needs to be higher in a virtual reality system than is needed when watching a display on a screen, such as a television. For example, a frame rate of 60 Hz is sufficient on a television to give the impression of a continuous stream of images, without noticeable stuttering between frames, whereas this would not be sufficient in a virtual reality system. However, a frame rate of 240 Hz is sufficient to give the impression of a continuous stream of images in a virtual reality system. This is achieved with the system 700 without needing to increase the frame rate of the rendering logic 704.

It should be clear that the numbers given above are by way of example only, and in other examples, the rendering logic 704 and the ray tracing logic 710 may operate at different rates to those specified above, and the ratio between the different rates may be different in different examples.

As an example, the ray tracing logic 710, the region identification logic 708 and the update logic 712 are configured to operate at a first rate, whereas the rendering logic 704 is configured to operate at a second rate, where the first rate (e.g. 240 Hz) is faster than the second rate (e.g. 60 Hz). This allows the regions to be identified, ray tracing data to be determined, and the initial image to be updated at the faster rate. In this way, an initial image may persist and ray traced data can repeatedly be added to it in the update logic 712. In the example given above, the rendering logic 704 (e.g. implementing a rasterisation technique) could run at 60 Hz, but the gaze tracking and identification of foveal regions of the image, the ray tracing and the updating of the initial images can run at 240 Hz. The acceleration structure building logic 706 may operate at a different rate (i.e. asynchronously) to the other components shown in FIG. 7. For example the acceleration structure building logic 706 could operate at a comparatively low frequency of 30 Hz or 60 Hz while the ray tracing logic 710 that is determining intersections with the acceleration structure could operate at 240 Hz. Furthermore, the time warp logic 714 and the display 716 may also operate asynchronously to the other components shown in FIG. 7.

Where the region identification logic 708 identifies regions by analysing the initial image, this identification may occur at the operational rate of the rendering logic 704, because the initial image will not change faster than this. Alternatively, even in this case, the identification of regions may occur at the faster rate of the ray tracing logic 710 because in some examples rays may indicate where more rays are needed.

In some examples, the time warp logic 714 is included and the updated image is passed to the time warp logic 714 from the update logic 712. The time warp logic is configured to apply an image warping process to the updated image before it is sent for display on the display 716. Since the initial image may be generated at a slower frame rate than the frame rate at which frames are displayed on the display 716, an image warping process can warp the images to take account of movement between the viewpoint of the initial images and the viewpoint from which the image will be displayed in order to display frames at time instances between the times at which initial images are generated. Time warping is particularly effective at compensating for rotations in the viewpoint, but considerably less correct when accounting for changes in viewpoint position. Such image warping processes are known in the art, such as described in the paper "Post-Rendering 3D Warping" by William Mark, Leonard McMillan and Gary Bishop, In Proceedings of 1997 Symposium on Interactive 3D Graphics, Providence, R.I., Apr. 27-30, 1997, pp. 7-16.

Some of the examples described herein are for use in a virtual reality system. In some other examples, the processing systems can be for use in an augmented reality system. Information about the real-world may be used to determine where rays are needed in the virtual world. For example, the region identification logic 708 could use the real-world information to identify regions in which ray tracing is to be performed or in which the ray density of the ray tracing is to be increased. In one such situation, cameras capturing the real world can detect changes that have an effect on rendering in the virtual world. For example a real object may move and alter the shadow cast on a virtual object, or a real object may move through the shadow umbra created by a virtual object.

Figure 8:
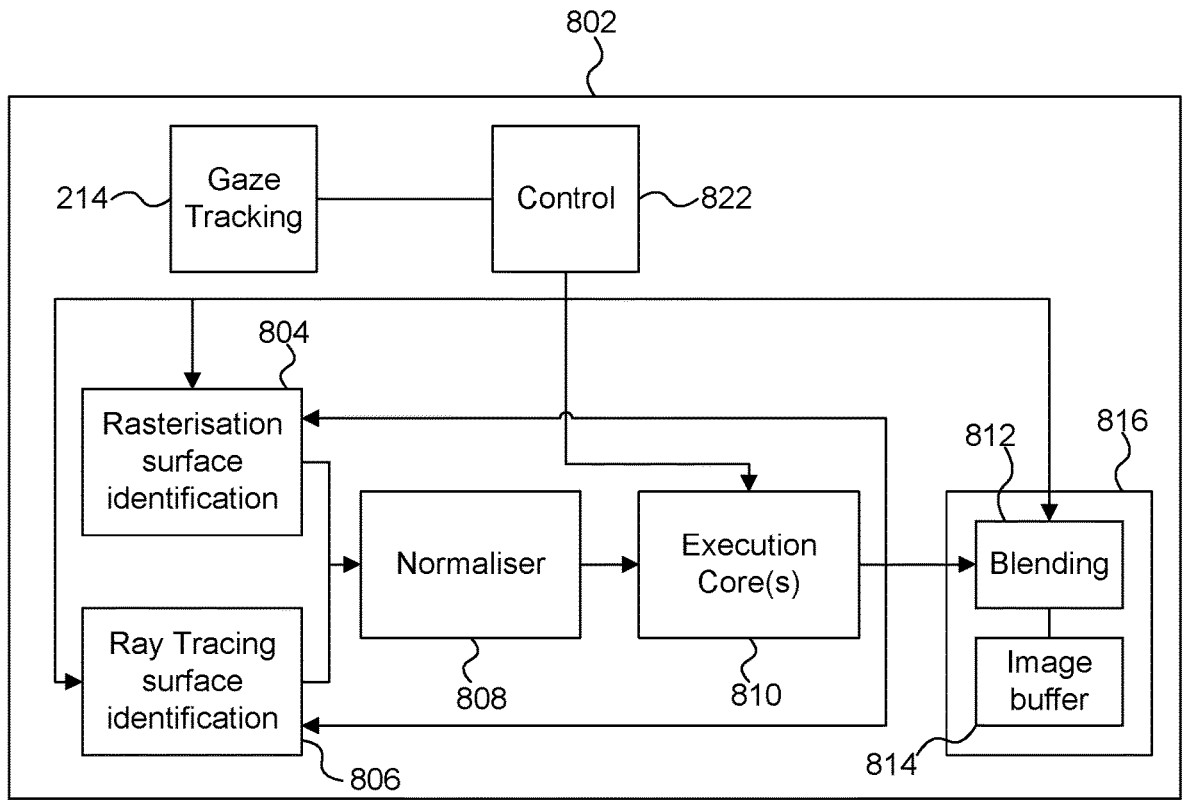
FIG. 8 illustrates an example of a graphics processing unit implementing a hybrid rendering system.

Hybrid rendering systems are described in detail in the previous U.S. patent application Ser. No. 13/953,754 (published as US 2014/0063016 A1). Hybrid rendering systems allow the ray tracing logic and the rasterisation logic to share some processing resources on the GPU. FIG. 8 illustrates an example of a GPU 802 implementing a hybrid rendering system which can be included in a processing system such as processing systems 202 and 612. The GPU 802 is similar to the GPU 202, but the rasterisation logic and the ray tracing logic share processing resources on the GPU 802. In particular, the GPU 802 comprises gaze tracking logic 214, control logic 822, rasterisation surface identification logic 804, ray tracing surface identification logic 806, a normaliser 808, one or more execution cores 810 and combining logic 816. The combining logic 816 comprises blending logic 812 and an image buffer 814.

The GPU 802 may provide a unified computation resource for performing shading work concurrently for surfaces identified by both ray tracing and by rasterisation techniques. For example, a unified computation resource executes shaders based on a normalized set of inputs, and a given surface is shaded by an associated shader module, regardless whether that surface is to be shaded responsive to a ray intersection or during rasterisation. In another example, different shader code modules may exist for shading ray tracing intersections and for rasterisation. In this example, surface shaders for rasterisation may emit rays to be intersection tested, and perform shading, in dependence on the results of intersection testing that ray.

Regardless whether 3-D rendering is being performed using rasterisation techniques or ray tracing (or both), two principal categories of activities to be performed are (1) identifying surfaces of 3-D scene geometry that may need to be shaded or otherwise processed during rendering of a 2-D image; and (2) determining what effect that surface should have on an image being rendered. These constituent operations may have different processing, data access, and data flow implications for rasterisation and for ray tracing.

The rasterisation surface identification logic 804 performs the processing for identifying surfaces of 3-D scene geometry that may need to be shaded or otherwise processed during rasterisation rendering of the rasterisation region of an image. This may involve performing depth tests at each sample position on primitives which overlap the sample position to determine which primitive is visible at each sample position. Indications of the identified surfaces at each sample position are provided to the normaliser 808.

The ray tracing surface identification logic 806 performs the processing for identifying surfaces of 3-D scene geometry that may need to be shaded or otherwise processed during ray tracing rendering of the region of interest of the image. This may involve tracing a ray for each sample position through the scene and performing intersection tests on the primitives in the scene to determine which primitive is intersected at each sample position. Indications of the identified surfaces at each sample position are provided to the normaliser 808.

The format of the data received at the normaliser 808 may be different depending on whether the data is received from the rasterisation surface identification logic 804 or the ray tracing surface identification logic 806. The normaliser processes the data to form a normalised set of shader inputs, which has a common format regardless of whether the surface is to be shaded responsive to a ray intersection or during rasterisation. The normalised set of shader inputs is passed to the execution cores 810. Shaders are executed on the execution cores 810 to determine what effect the identified surfaces should have on an image being rendered. The execution of a shader may cause further tests to be performed by the surface identification logic 804 and/or 806. For example, the execution of a shader may cause one or more new rays to be emitted (e.g. to model a reflection), and these rays are passed back to the ray tracing surface identification logic 806 to determine which surfaces the emitted rays intersect. As another example, some geometry which is processed using a rasterisation technique may have a translucent or a "punch through" object type. Conceptually, punch through objects include primitives which may have holes in them. In this case the result of executing a shader at the execution cores 810 may result in another pass through the rasterisation surface identification logic 804 to determine image values to be blended with translucent primitives or to be rendered in the sample positions corresponding to the holes of punch through primitives.

For rendering some sample positions, a rasterisation process may begin by identifying a surface which is visible at the sample position (at the rasterisation surface identification logic 804) then the execution of a shader at the execution core(s) 810 may emit a ray which can then be processed using a ray tracing technique. Therefore, both ray tracing and rasterisation may be used to render a particular image value at a particular sample position. In this case, the image value may be considered to have been rendered using either the rasterisation technique or the ray tracing technique such that it may be part of the rasterisation region of the image or the region of interest of the image.

The control logic 822 can control the operation of the rasterisation surface identification logic 804, the ray tracing surface identification logic 806, the execution core(s) 810 and the combining logic 816, so that the region of interest of an image is rendered by a ray tracing technique and the rasterisation region of the image is rendered by a rasterisation technique. The image buffer 814 of the combining logic 814 can store image values for each sample position (or each pixel position) of an image. For example, the rasterisation region of the image (which may include the whole of the image) can be rendered by rasterisation and the rendered image values can be stored in the image buffer 814. The rasterised image values can be used as a background for the ray traced image values in the region of interest. That is, the ray tracing technique can then be used to determine the image values for the region of interest. In the blending region, the blending logic 812 can blend the image values determined by ray tracing with the rasterised image values which were stored in the image buffer 814. If there is a part of the region of interest which is not included in the blending region, then the image values determined by ray tracing for this part of the region of interest can be written into the image buffer 814, which may, or may not, overwrite image values previously stored in the image buffer 814 for this part of the region of interest. When all of the image values of the rendered image have been stored in the image buffer 814, the image values may be output to a display to be displayed to a user, as described above.

In the hybrid GPU 802 the rasterisation surface identification logic 804 may be considered to be "rasterisation logic", and the ray tracing surface identification logic 806 may be considered to be "ray tracing logic". The normaliser 808 means that the same shader programs can be executed for shading primitive fragments irrespective of whether rasterisation or ray tracing has been used to identify the primitive fragments as being visible. In other words, the ray tracing logic is configured to identify primitive fragments to be shaded, the rasterisation logic is configured to identify primitive fragments to be shaded, and the one or more execution cores are configured to apply shading to identified primitive fragments irrespective of whether the primitive fragments are identified by the ray tracing logic or by the rasterisation logic. Using common shader programs may be beneficial to avoid a noticeable difference in the effects (e.g. filtering, colouring or blending effects, etc.) which are included in the different regions of the image, i.e. within the region(s) of interest as compared to outside of the region(s) of interest. This may be beneficial because a change in the effects used as the region of interest moves over the image may be noticeable and distracting for the user.

In some examples, the whole image could be processed according to a rasterisation technique and then within the region(s) of interest rays may be emitted for processing by the ray tracing logic 806 to add detail to the region(s) of interest in the image. The number of rays emitted per sample position may vary. For example, this may vary across the blending region such that near the centre of a region of interest more rays are processed by the ray tracing logic than are processed further away from the centre of the region of interest. Furthermore, as mentioned above, in some extreme examples, a region of interest may extend across the whole image, but the density of rays that are processed by the ray tracing logic may be higher closer to the centre of the region of interest or closer to a gaze position, i.e. closer to the foveal region, compared to the corresponding ray density further away from the centre of the region of interest or further from the gaze position.

In some examples, a focal depth can be determined and then a depth of field for the rendered image can be set. For example, the gaze position can be used to identify one or more objects that the user gaze is directed at. The depth of the one or more identified objects at the gaze position can be determined, e.g. as part of a rasterisation process. The determined depth(s) can be used to set a focal depth. If more than one object is identified then the focal depth can be determined as an average (e.g. mean, median or mode) of the determined depths. A depth of field can then be set based on the focal depth. Following a rasterisation stage, depths of objects in the image are determined, and a number of rays which are processed for different regions of the image may vary in dependence on the depths of the objects in those regions. For example, a higher ray density may be used to process regions with visible objects having depths that fall within the depth of field compared to a ray density used to process regions with visible objects having depths that fall outside of the depth of field. In this way, a level of detail (which generally corresponds with the ray density) is greater for regions of the rendered image containing visible objects having depths that fall within the depth of field compared to regions of the rendered image containing visible objects having depths that fall outside of the depth of field.

The gaze tracking logic provides an indication of a gaze position to the control logic. The size of the region of interest may be set by the control logic. The size of the region of interest may be fixed or variable. To give some examples, if the size of the region of interest is variable, the control logic may set the size of the region of interest (i.e. the region rendered using ray tracing) based on one or more of: (i) a latency of a gaze tracking process, (ii) speed of movement of a gaze position, (iii) content of the image to be rendered, (iv) a current processing load on the processing system, and (v) a user preference.

The latency of the gaze tracking process can be defined as the time elapsed between capturing an image of the user from which the gaze position is to be determined and displaying a corresponding rendered image on the display. A shorter latency will mean that the region of interest better matches the foveal position at the time that the image is displayed to the user. To give an example, a latency of 10 ms is generally acceptable, whereas with a latency of 25 ms a user might be able to perceive that the rendered region of interest does not match with the current foveal position of the user's gaze when the image is displayed. Therefore, with a longer latency, the size of the region of interest may be increased to allow for more eye movement in the time between the gaze tracking and the rendering of the image.

In examples described herein the visual processing required for gaze tracking is performed by the gaze tracking logic 214 which is included on the same SOC as the GPU 208. Therefore, the results of the gaze tracking (e.g. the gaze position) can be piped directly into the GPU 208 rather than being stored into memory and then read out of memory. This helps to reduce the latency, which in turn means that the size of the region of interest can be reduced, thereby improving performance even further in terms of reducing the power consumption and increasing the speed of rendering. In this way, there can be tight integration between the eye tracking sensor pipeline (e.g. the camera pipeline and gaze tracking logic) and the rendering logic (e.g. the rasterisation logic and the ray tracing logic), such as to minimise the latency from the user's eye moving to a frame being presented to the user which takes account of the new gaze position. For example, the different processing modules on the SOC may share a synchronisation signal such that the timing of operations on the different processing modules (e.g. the camera pipeline, gaze tracking logic, rasterisation logic and ray tracing logic) can be synchronised. If the different processing modules were running in an unsynchronized manner, delays could accumulate as data moves from one module to another.

In examples described above the gaze tracking logic 214 is implemented on the GPU 208. However, in other examples, the gaze tracking logic 214 could be implemented in the camera pipeline 210 and the results of the gaze tracking (e.g. the determined gaze position) can be passed from the camera pipeline 210 to the GPU 208. Furthermore, as mentioned above, the gaze tracing logic 214 may not use a camera, and may use other gaze tracking techniques to identify a gaze position. Many eye trackers (or "gaze trackers") use some kind of light sensor, but they might not be considered to be "cameras" in a conventional sense, in that they might not be devices for recording images using a matrix of light sensitive elements behind one or more lenses in the way that most cameras are. For example, some eye trackers use pupil location, others use cornea shape, and some could use the retina to determine a gaze position. In one example, gaze tracking logic could shine low-power infrared focussed lights at the eye and have single (unfocussed) light sensors inside a head-mounted-display cavity that could infer the eye position based on the reflected light intensity at each sensor. If the speed with which a user moves their gaze position increases then the size of the region of interest may be increased. This can reduce the user's perception of the boundary of the rendered region of interest, but it may mean that more processing power and time may be needed to render the image since more of the image will be rendered by the ray tracing technique which is more complex than the rasterisation technique. The speed with which a user moves their gaze position can be determined by the gaze tracking logic by analysing the sequence of captured images.

If the content of the image being rendered is very detailed then the size of the region of interest may be decreased. This is because a more detailed image will be more complex to render by ray tracing, so to reduce the increase in rendering complexity for rendering the image, a smaller portion of the image may be rendered by ray tracing.

If the current processing load on the processing system increases, the size of the region of interest may be decreased. Rendering a smaller portion of the image by ray tracing will reduce the rendering complexity for rendering the image.

A user may prefer a smaller or larger region of the image to be rendered by ray tracing, so the user may be able to set a user preference to set the size of the region of interest. For example a user may find the boundary of the region of interest distracting and so may increase the size of the region of interest so that the boundary is further into the periphery of the user's field of vision.

Some examples may use a form of predictive-only "foveation" in which regions of the image are rendered and displayed in an order that gives a high likelihood of rendering the high detail areas of the image first. This would allow the whole image to be rendered in high detail with the detailed image regions being rendered and displayed first, such that these regions have low latencies. Less detailed regions of the image may have longer latencies, but this might not significantly degrade the user's perception of the images that are rendered and displayed. For example, if the whole scene could be rendered in high detail within 33 ms (i.e. at 30 Hz), and if time warping was used and parts of the image are progressively blended at much higher rates (e.g. 240 Hz), then eye tracking might not be needed at all.

In examples described above, there is just one user. However, in other examples as mentioned above, there may be more than one user viewing the rendered images. In this case, the gaze tracking logic may determine gaze positions for each of the users and a respective region of interest may be determined for each of the gaze positions, e.g. surrounding the respective gaze positions. The multiple regions of interest can then be rendered using ray tracing, whilst (at least) the rest of the image is rendered using rasterisation.

As a matter of terminology, the region(s) of "interest" might not be "interesting". A region of interest is a region that is to be rendered in greater detail than other regions, e.g. a foveal region or other particular regions outside of the foveal region where level of detail is perceived strongly in human vision. It is therefore beneficial to render the region (s) of interest using a ray tracing technique because ray tracing can provide very detailed images.

Figure 9:
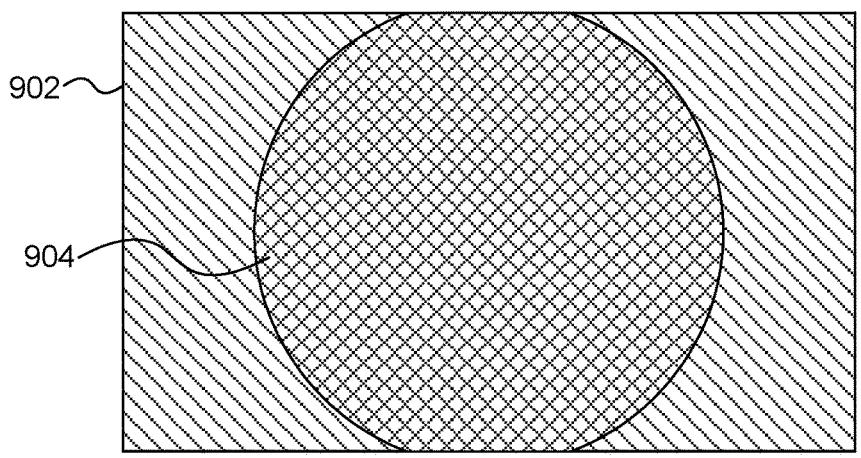
FIG. 9 shows an example of a central region of interest within an image.

In examples described above, the region of interest is controlled to surround a detected gaze position. In simpler examples, gaze tracking logic and camera pipelines are not needed in the processing system, and instead a region of interest is a fixed (e.g. central) region of the image. This may be the case irrespective of a user's gaze. FIG. 9 shows an example of an image 902 with a central region of interest 904. The region of interest 904 will be rendered by ray tracing as in the examples described above, and the rest of the image 902 will be rendered by rasterisation, and the two renderings may be blended together in a blending region. Since the region of interest 904 does not move to track the user's gaze, the region 904 is set to be larger than in the previous examples. For example, in this case the region of interest 904 covers approximately half of the area of the image 902. Therefore, there is not such a great processing saving in this example compared to the examples described above which include gaze tracking techniques, where the size of the region of interest can be reduced to approximately 1% of the area of the image. It is noted that in examples described above the rasterisation region is contiguous, but in the example shown in FIG. 8 the rasterisation might not be fully contiguous (although it might be contiguous in this example too).

In other examples, a region of interest may be determined by the content in the image. For example, if an object in a scene is desired to be the focus of attention then a region of the image containing that object may be determined to be a region of interest such that it is rendered using ray tracing. This may be the case irrespective of a user's gaze and irrespective of the position of the object in the image, i.e. the object does not need to be centrally located. As another example, a region of the image containing a moving object may be determined to be a region of interest such that it is processed using a ray tracing technique. As another example, the gaze tracking logic could identify "hot spots" where the user's eyes are determined to frequently be attracted to (e.g. two bits of the image that are both capturing the user's attention, where the gaze is bouncing between them), and these hot spots could be determined to be regions of interest such that they are processed using a ray tracing technique. As another example, foveal focus regions from the past (as a subset or simplification of the former) could be determined to be regions of interest such that they are processed using a ray tracing technique. As another example, future foveal destinations could be predicted based on a model of the motion of the eye and/or the saccade mechanism, and those predicted future foveal destinations could be determined to be regions of interest such that they are processed using a ray tracing technique. As another example, areas of high image complexity could be identified according to a complexity metric (e.g. number of primitives in a region or number of edges in a region, etc.) and those identified areas could be determined to be regions of interest such that they are processed using a ray tracing technique. The complexity metric may be based on known information content and/or augmentations within the image, for example signage may be rendered in high detail because it is likely the user will gaze there.

In other examples, which include multiple regions of interest, the regions of interest may be determined to be regions of interest for different reasons. For example, a first region of interest may correspond to a foveal region determined based on the detected gaze position, and a second region of interest may be fixed at the centre of the image.

The ray tracing logic and the rasterisation logic may be configured to render images at the same frame rate. However, in other examples, the ray tracing logic may render the region of interest of the images at a first frame rate, and the rasterisation logic may render the rasterisation region of the images at a second frame rate, where the first frame rate is different to the second frame rate. The first frame rate could be higher or lower than the second frame rate.

The pixel density of the rendered image may be higher in the region of interest than in other regions, e.g. in the periphery. In examples described herein the rasterisation logic renders the whole of the rasterisation region at the same resolution. However, in other examples, the rasterisation logic may perform a plurality of renders of respective portions of the rasterisation region of the image at a respective plurality of resolutions (e.g. with the resolution decreasing for more peripheral portions of the rasterisation region). In this case, the combining logic would combine the rendered region of interest of the image rendered using the ray tracing technique and the plurality of rendered portions of the rasterisation region rendered using the rasterisation technique, to form the rendered image.

In examples described above, different rendering techniques (e.g. rasterisation and ray tracing) are described as being used for rendering different regions. However, more broadly, different rendering approaches may be used for rendering different areas of an image. For example, a different approach to ray tracing may be implemented for regions of interest compared to a ray tracing approach implemented for other regions. For example, a low-detail scene database and a high-detail scene database may be generated to represent the geometry in the scene being rendered. The high-detail scene database may describe the geometry to a greater resolution (e.g. including more polygons and using more bits of data to represent attributes of primitives, e.g. the x, y and z coordinates of the primitive vertices and other primitive data associated with the primitive) than is used to describe geometry in the low-detail scene database. In regions of interest (e.g. in foveal region(s) or regions of high image-detail) the ray tracing logic can use the high-detail scene database to perform the ray tracing (e.g. to perform the intersection testing of rays against scene geometry and to perform shading in response to intersections), such that high quality rendering results are achieved in the regions of interest. In contrast, outside of the regions of interest (e.g. away from the foveal region(s) or regions of high image-detail) the ray tracing logic can use the low-detail scene database to perform the ray tracing (e.g. to perform the intersection testing of rays against scene geometry and to perform shading in response to intersections), such that the processing requirements of the ray tracing logic are reduced for rendering areas of the image in which the quality of the rendering is not as important as in the regions of interest. Furthermore, different shaders may be implemented in regions of interest (e.g. in foveal region(s) or regions of high image-detail) compared to those used away from the regions of interest. For example, complex shaders for implementing accurate reflections in a scene could be calculated for regions of interest in the scene, whilst other shaders (e.g. less complex shaders) may be implemented for modelling reflections for regions which are not regions of interest in the scene. The same principles can apply to other shaders, e.g. for implementing effects such as shadows, global illumination, indirect and soft lighting and other phenomena. By controlling which shader programs are executed for rendering different areas of an image, more processing power can be focussed on rendering regions of interest compared to rendering regions which are not regions of interest.

Furthermore, there is not necessarily a hard division between what is a "region of interest" and what is "not a region of interest"; and instead the rendering complexity (e.g. the level of detail in the geometry database that is used, and/or the level of complexity in the shader programs that are executed) can be controlled to be one of many levels of complexity (e.g. three or more levels of complexity) based on a level of interest determined for the region. For example, there may be two measures of "interest" for a region: (i) whether the region is in a foveal region, and (ii) whether the region shows high frequency detail in the image. The highest rendering complexity may be assigned to high-detail, foveal regions of the image; whilst the lowest rendering complexity may be assigned to low-detail, non-foveal regions of the image. The rendering complexity for low-detail, foveal regions and high-detail, non-foveal regions may be some-where between the two extremes. It may be beneficial for some pixels to blend some rays that intersect the high detail scene and/or run the high detail shaders with some rays that intersect the low detail scene and/or run the low detail shaders. This ratio can be varied from pixel to pixel depending on the interest assigned to that pixel. Furthermore, the manner in which the complexity is changes may depend upon the reason that a region is either classified as a region of interest or not. For example, a high-detail, peripheral region of the image may be rendered using a high-detail database for the rendering so that aliasing effects can be reduced, but it might not be beneficial to implement complex shader programs to implement lighting effects such as shadows, reflections and global illumination, etc. This is because in the periphery, humans are sensitive to aliasing but not so sensitive to the exact appearance of image. In contrast, in the foveal region, humans are very sensitive to image detail such as accurate lighting effects such as shadows, reflections and global illumination, etc. but not so sensitive to aliasing. Therefore, in low-detail, foveal regions of an image, the ray tracing logic may use a low-detail database for rendering to reduce the processing cost of the ray tracing process, but complex shader programs may be executed to implement lighting effects such as shadows, reflections and global illumination, etc.

Figure 10:
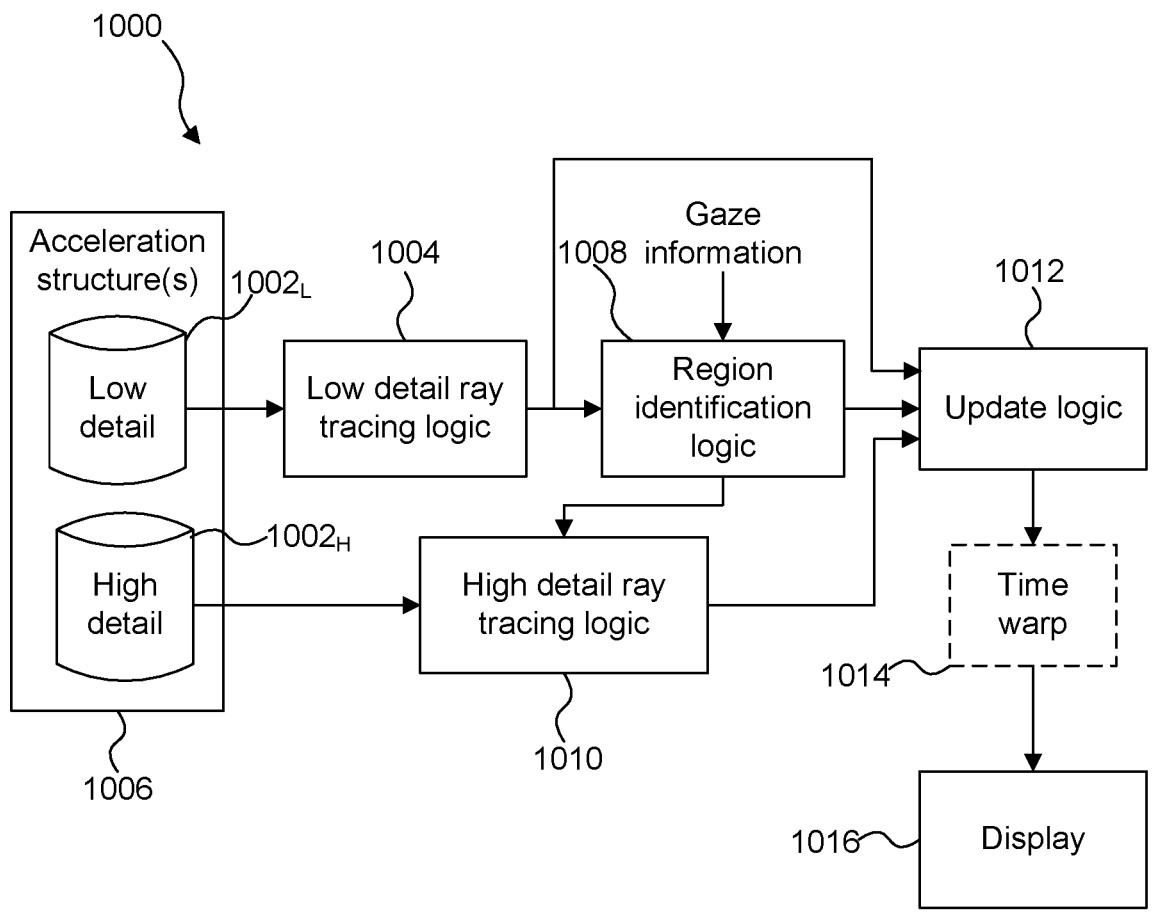
FIG. 10 illustrates a system where image information from low detail ray tracing is combined with image information from high detail ray tracing to produce a high detail image that responds to changes in gaze.

For example, FIG. 10 illustrates a processing system 1000 comprising two acceleration structures: a low-detail acceleration structure $1002_L$ and a high-detail acceleration structure $1002_H$. The system 100 also comprises low-detail ray tracing logic 1004, region identification logic 1008, high-detail ray tracing logic 1010, update logic 1012 and a display 1016. The system 1000 might also include time warping logic 1014 in some examples. The logic blocks 1004 to 1014 may be implemented in hardware, software, firmware or any combination thereof. The processing system 1000 is similar to the processing system 700 shown in FIG. 7, but in system 1000 the rendering logic is implemented as low-detail ray tracing logic 1004, which performs ray tracing at a lower detail (e.g. fewer rays) than the ray tracing performed by the high-detail ray tracing logic 1010, and in system 1000 both the rendering logic blocks 1004 and 1010 use an acceleration structure. In general there may be one or more acceleration structures 1006 (e.g. both the logic blocks 1004 and 1010 could use the same acceleration structure), but in the example shown in FIG. 10, there are two acceleration structures which are used by the respective logic blocks 1004 and 1010. The two acceleration structures $1002_L$ and $1002_H$ are versions of an acceleration structure representing the scene geometry, but at different levels of detail. The rest of the system 1000 operates in the same manner as described above with reference to the system 700 shown in FIG. 7. Therefore, the low detail ray tracing logic 1004 generates an initial image which is provided to the region identification logic 1008 and to the update logic 1012. The region identification logic 1008 identifies regions which are to be ray traced using the high-detail ray tracing logic 1010. Indications of the identified regions are provided to the high-detail ray tracing logic 1010. The high-detail ray tracing logic 1010 performs ray tracing at a high level of detail for the identified regions, e.g. using a higher ray density than that used by low-detail ray tracing logic 1004, and/or using the high detail acceleration structure 1006. The results from the high detail ray tracing logic 1010 are provided to the update logic which updates the identified regions of the initial image with the results of the high-detail ray tracing performed by logic 1010. The updated image is optionally time warped by time warping logic 1014 and then provided to the display 1016 for display thereon. Similarly to as described above, the low-detail ray tracing logic 1004 may operate asynchronously to the high-detail ray tracing logic 1010. For example, the low-detail ray tracing logic 1004 may operate at 60 Hz, whilst the region identification logic 1008, high detail ray tracing logic 1010 and the update logic 1012 may operate at 240 Hz. The acceleration structures $1002_L$ and $1002_H$ may be constructed as described above.

In some examples, some decision logic may be included at the start of the processing pipeline which operates to decide which function (e.g. a rasterisation or a ray tracing rendering technique or both) to use for which parts of the image. In the examples described above, a single image includes different regions to be processed using different rendering techniques. However, in some examples, the decision logic may decide that it would be most appropriate to use a single rendering technique (e.g. rasterisation or ray tracing) for an entire image, e.g. based on the content of the image. In that case a single rendering technique would be selectively used to render the entire image, based on the decision from the decision logic.

The processing systems of FIGS. 2, 6b and 7 are shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing systems described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a processing system configured to perform any of the methods described herein, or to manufacture a processing system comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing system will now be described with respect to FIG. 11.

Figure 11:
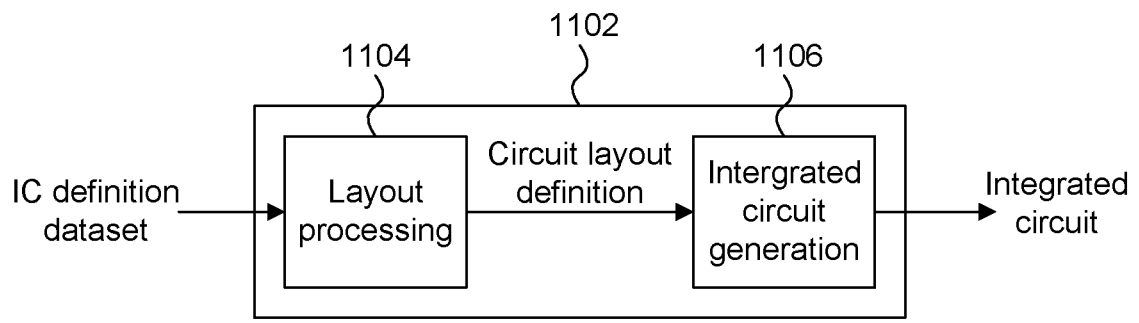
FIG. 11 shows an integrated circuit manufacturing system for generating an integrated circuit embodying a processing system.

FIG. 11 shows an example of an integrated circuit (IC) manufacturing system 1102 which comprises a layout processing system 1104 and an integrated circuit generation system 1106. The IC manufacturing system 1102 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 1102 to manufacture an integrated circuit embodying a processing system as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A processing system configured to render one or more images of a scene, the processing system comprising:
   rendering logic configured to process graphics data to generate an initial image comprising pixel values representing an image of the scene;
   region identification logic configured to identify one or more regions of the initial image;
   ray tracing logic configured to perform ray tracing to determine ray traced data for the identified one or more regions of the initial image; and
   update logic configured to update the initial image using the determined ray traced data for the identified one or more regions of the initial image by adding detail to the identified one or more regions of the initial image, to thereby determine an updated image to be outputted for display;
   wherein the rendering logic and the ray tracing logic are configured to operate asynchronously; and
   wherein the ray tracing logic, the region identification logic and the update logic are configured to operate at a first frame rate and the rendering logic is configured to operate at a second frame rate, said first frame rate being faster than said second frame rate.

2. The processing system of claim 1 wherein the rendering logic is configured to process the graphics data using a rasterisation technique to generate the initial image.

3. The processing system of claim 1 wherein the rendering logic is configured to process the graphics data using a ray tracing technique to generate the initial image.

4. The processing system of claim 1 wherein the initial image is a lower detail image than the updated image.

5. The processing system of claim 1 further comprising gaze tracking logic configured to determine one or more gaze positions for the initial image, wherein the region identification logic is configured to receive one or more indications of the one or more determined gaze positions, and to identify the one or more regions of the initial image based on the one or more determined gaze positions.

6. The processing system of claim 5 wherein the gaze tracking logic is configured to implement a predictive model to anticipate movements in gaze.

7. The processing system of claim 5 wherein one of the one or more identified regions of the initial image surrounds one of the one or more determined gaze positions, thereby representing a foveal region.

8. The processing system of claim 7 further comprising a camera pipeline which is configured to:
   receive image data from a camera which is arranged to capture images of a user looking at a display on which a rendered image is to be displayed; and
   process the received image data to generate a captured image;
   wherein the gaze tracking logic is configured to analyse the captured image to determine the gaze position for the initial image.

9. The processing system of claim 8 wherein the ray tracing logic and the rasterisation logic are implemented on a graphics processing unit,
   and wherein the camera pipeline and the graphics processing unit are implemented as part of a system on chip (SOC).

10. The processing system of claim 1 wherein the region identification logic is configured to analyse the initial image to determine one or more regions of high frequency, wherein the one or more determined regions of high frequency are one or more identified regions of the initial image.

11. The processing system of claim 1 further comprising time warping logic configured to apply an image warping process to the updated image before it is sent for display.

12. The processing system of claim 1 further comprising acceleration structure building logic configured to determine an acceleration structure representing the graphics data of geometry in a scene of which an image is to be rendered.

13. The processing system of claim 12 wherein the processing system is configured to render a plurality of images representing a sequence of frames, and wherein the acceleration structure building logic is configured to determine the acceleration structure for a current frame by updating the acceleration structure for the preceding frame.

14. The processing system of claim 1 wherein the processing system is arranged to be included in a virtual reality system or an augmented reality system.

15. A method of rendering one or more images of a scene at a processing system, the method comprising:
   processing graphics data to generate an initial image comprising pixel values representing an image of the scene;
   identifying one or more regions of the initial image;
   performing ray tracing to determine ray traced data for the identified one or more regions of the initial image; and
   updating the initial image using the determined ray traced data for the identified one or more regions of the initial image by adding detail to the identified one or more regions of the initial image, to thereby determine an updated image to be outputted for display;
   wherein said performing ray tracing, said identifying one or more regions of the initial image and said updating the initial image are performed at a first frame rate, and wherein said processing graphics data to generate an initial image is performed at a second frame rate, wherein the first frame rate is faster than the second frame rate.

16. The method of claim 15 further comprising displaying an image based on the updated image.

17. The method of claim 15 wherein the processing graphics data to generate an initial image is performed at an asynchronous rate to the performing ray tracing to determine traced data.

18. A non-transitory computer readable storage medium having stored thereon a computer readable dataset description of an integrated circuit that, when processed in an integrated circuit manufacturing system, causes the integrated circuit manufacturing system to manufacture a processing system comprising:
   rendering logic configured to process graphics data to generate an initial image comprising pixel values representing an image of a scene;

region identification logic configured to identify one or more regions of the initial image;

ray tracing logic configured to perform ray tracing to determine ray traced data for the identified one or more regions of the initial image; and update logic configured to update the initial image using the determined ray traced data for the identified one or more regions of the initial image by adding detail to the identified one or more regions of the initial image, to thereby determine an updated image to be outputted for display;

wherein the rendering logic and the ray tracing logic are configured to operate asynchronously;

wherein the ray tracing logic, the region identification logic and the update logic are configured to operate at a first frame rate, and the rendering logic is configured to operate at a second frame rate, the first frame rate being faster than the second frame rate.

* * * * *

UNITED STATES PATENT AND TRADEMARK OFFICE
CERTIFICATE OF CORRECTION

Page 1 of 1

PATENT NO.         : 11,010,956 B2
APPLICATION NO.    : 15/372589
DATED              : May 18, 2021
INVENTOR(S)        : Blackmon et al.

It is certified that error appears in the above-identified patent and that said Letters Patent is hereby corrected as shown below:

In the Claims

Claim 17 - Column 30, Line 58 "traced data" should be replaced with ---ray traced data---

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*